US007778765B2

(12) United States Patent
Toyohara et al.

(10) Patent No.: US 7,778,765 B2
(45) Date of Patent: Aug. 17, 2010

(54) FUEL INJECTION CONTROL APPARATUS FOR INTERNAL COMBUSTION ENGINE

(75) Inventors: Masahiro Toyohara, Hitachiohta (JP); Takao Miyake, Hitachinaka (JP); Masahiro Sasaki, Hitachinaka (JP); Takuya Mayuzumi, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/339,464

(22) Filed: Dec. 19, 2008

(65) Prior Publication Data

US 2009/0177367 A1 Jul. 9, 2009

(30) Foreign Application Priority Data

Jan. 7, 2008 (JP) ............................ 2008-000803

(51) Int. Cl.
*B60T 7/12* (2006.01)
*F02M 1/00* (2006.01)

(52) U.S. Cl. ...................................... 701/105; 123/438

(58) Field of Classification Search ................. 701/103, 701/104, 105; 123/438, 445, 448, 472, 478, 123/480, 497

See application file for complete search history.

(56) References Cited

FOREIGN PATENT DOCUMENTS

| | | | |
|---|---|---|---|
| JP | 2003-65129 | A | 3/2003 |
| JP | 3562125 | B2 | 6/2004 |
| JP | 3768723 | B2 | 2/2006 |

*Primary Examiner*—John T Kwon
(74) *Attorney, Agent, or Firm*—Crowell & Moring LLP

(57) ABSTRACT

A fuel injection control apparatus includes a computing unit that calculates a pulse width for a pulse signal which drives the valve of a fuel injector, based on the operational state of the internal combustion engine and fuel pressure detected by a fuel pressure sensor. After a valve-opening command has turned on and a high valve-opening current has been supplied to open the fuel injector valve, a fuel injector driving signal waveform command unit discharges the current and supplies a small hold current Ih2 to maintain the injector's valve-open state. After the elapse of a predetermined rapid-discharge starting time from the turn-on of the valve-opening command, the fuel injector driving signal waveform command unit rapidly discharges the current until the hold current Ih2 has been reached.

9 Claims, 11 Drawing Sheets

FUEL INJECTION CONTROL APPARATUS FOR INTERNAL COMBUSTION ENGINE

BACKGROUND OF THE INVENTION

1. Field of the Invention

The present invention relates generally to fuel injection control apparatus for internal combustion engines. More particularly, the invention concerns a fuel injection control apparatus for an internal combustion engine, capable of improving a minimum fuel injection quantity.

2. Description of the Related Art

Internal combustion engines are equipped with a fuel injection control apparatus that computes an appropriate fuel injection quantity according to the particular operational state of the engine and drives a fuel injector for supplying a fuel. The fuel injector opens or closes a valve constituting the injector, by utilizing the magnetic force generated by a built-in coil energized with the electric current allowing the injector to open the valve and to retain this open state, and thus injects the amount of fuel that is appropriate for the particular opening duration of the valve. The quantity of fuel injected is determined primarily by a differential between the pressure of the fuel and the atmospheric pressure of the injector nozzle, and by the time during which the fuel is being injected with the valve maintained in the open state. To inject the appropriate quantity of fuel, therefore, there is a need to set up the appropriate valve-open state hold time according to the particular fuel pressure and to open/close the valve rapidly and accurately.

However, during the time period from completion of power distribution to the injector to actual closing of the valve, the closing operation thereof is retarded by factors such as a delay in current circuit response. Traditionally, therefore, it has been a common practice to set up the power distribution time for the injector with the above response delay taken into account (i.e., a correction value has been added as an ineffective pulse signal width beforehand to injection pulse data computations).

In an alternative known method, when the supply current is switched from a high current for opening the injector valve (hereinafter, this current is referred to as the valve-opening current), to a low current for retaining the open state of the valve (hereinafter, this current is referred to as the hold current), the valve-opening current is rapidly discharged to minimize the response delay of the current circuit. This method is described in JP-3562125, for example.

In other known methods, in order to increase the valve-opening force of the injector according to fuel pressure, when a peak of the valve-opening current is reached, the supply time of the peak current is set to be variable, and when the injector pulse signal width is short, the peak current hold time of the valve-opening current is reduced. Thus, when power distribution to the injector is terminated, the injector is controlled to the hold current to stabilize the response delay of the current circuit. These methods are described in JP-A-2003-65129 and JP-3768723, for example.

SUMMARY OF THE INVENTION

In recent years, reduction in the idling speeds of internal combustion engines in terms of reduction in fuel consumption rate has been required and a demand for the minimum quantity of fuel injectable from fuel injectors tends to be decreasing. Likewise, for reduction in fuel consumption rate, the chances of fuel cuts for not injecting the fuel when the output of the internal combustion engine is unnecessary are increasing, which, in turn, is also increasing the frequency of resumption of fuel injection. Resuming fuel injection requires injecting a small quantity of fuel equivalent to a no-load state. Also, split injection is used for increased output and/or for improved exhaust performance. Split injection is intended to improve the performance of the internal combustion engine by injecting timely in multiple split shots the necessary quantity of fuel to be originally injected in one shot. During split inspection, the fuel injection quantity per shot may be required to be reduced.

For these reasons, the fuel injectors and fuel injection systems that can inject a small quantity of fuel are being called for with the demand for the improvement of internal combustion engines in performance. For a small quantity of fuel injection, the time during which the valve-open state of the injector is maintained needs to be reduced. In this case, the time which the valve occupies from the open state to a closed state (this time is hereinafter referred to as the valve-closing delay) increases with respect to the retention time of the injector valve-open state. Any errors in the valve-closing delay, therefore, directly affect the accuracy of the injection quantity very significantly. In addition, the valve-closing delay changes with the response delay of the electric circuit. This change in the valve-closing delay has caused the injector valve-opening delay to vary according to the particular flow state of the current through the injector, in the termination timing of power distribution thereto, and the variation has impeded the improvement of the internal combustion engine in performance.

Although the methods described in JP-3562125, JP-A-2003-65129, JP-3768723, and JP-3768723 are effective for improving the valve-opening delay and the valve-closing delay, none of the methods has sufficed to reduce the minimum quantity of injection required.

An object of the present invention is to provide a fuel injection control apparatus for an internal combustion engine, capable of opening and closing accurately a valve of the fuel injector even when the quantity of injection required is small and a pulse duration of a driving pulse signal to the fuel injector is short.

(1) In order to attain the above object, the present invention provides as an aspect thereof: a fuel injector control apparatus used in an internal combustion engine which includes a fuel injector for injecting a fuel directly into a combustion chamber of the internal combustion engine, and a fuel pressure sensor for detecting a pressure of the fuel supplied to the fuel injector, the control apparatus adapted to control the fuel injector for driving thereof by calculating, from an operational state of the internal combustion engine and the fuel pressure detected by the fuel pressure sensor, pulse width of a pulse signal which drives the valve of the injector, wherein the control apparatus comprises a driving signal waveform command unit that is configured such that after an valve-opening command has turned on and a high valve-opening current for opening the fuel injector valve has been supplied from a high-voltage source to the fuel injector, the command unit discharges the current and supplies from a low-voltage source a small hold current Ih2 to allow the fuel injector to maintain the valve-open state, and such that during a time from supply of the valve-opening current to an arrival at a value of the hold current Ih2, after an elapse of a previously assigned rapid-discharge starting time Tsy from the turn-on of the valve-opening command, the command unit rapidly discharges the current until the hold current Ih2 has been reached.

Because of the above system configuration, the valve of the fuel injector can be opened and closed accurately, even when the injection quantity required is small and a duration of power distribution (i.e., the pulse width of the pulse signal) to the fuel injector is short.

(2) In above item (1), the driving signal waveform command unit preferably renders the rapid-discharge starting time Tsy variable in accordance with at least one of two parameters, namely, the driving pulse width or the fuel pressure detected by the fuel pressure sensor; wherein, as the driving pulse width decreases, the rapid-discharge starting time Tsy is reduced, and as the fuel pressure lowers, the rapid-discharge starting time Tsy is reduced.

(3) In above item (2), the driving signal waveform command unit preferably controls a minimum value of the rapid-discharge starting time Tsy to obtain a time longer than that required for the valve-opening current to reach a predetermined peak current after the valve-opening command turned on.

(4) In above item (1), the driving signal waveform command unit is preferably configured such that after the high valve-opening current for opening the valve of the fuel injector has been supplied to the injector, the command unit renders a discharge-starting peak current Ipa variable in accordance with at least one of two parameters, namely, the driving pulse width or the fuel pressure detected by the fuel pressure sensor; wherein, as the driving pulse width decreases, the peak current Ipa is reduced, and as the fuel pressure lowers, the peak current Ipa is reduced.

(5) In above item (1), the driving signal waveform command unit preferably renders a voltage Vboost of the high-voltage source variable in accordance with at least one of two parameters, namely, the driving pulse width or the fuel pressure detected by the fuel pressure sensor; wherein, as the driving pulse width decreases, the voltage Vboost of the high-voltage source is increased, and as the fuel pressure lowers, the voltage Vboost of the high-voltage source is reduced.

(6) In above item (1), before turning on the valve-opening command, the driving signal waveform command unit preferably charges into the fuel injector an excitation current Ipr smaller than that at which the valve of the fuel injector operates.

(7) In order to attain the above object, the present invention provides as another aspect thereof: a fuel injector control apparatus used in an internal combustion engine which includes a fuel injector for injecting a fuel directly into a combustion chamber of the internal combustion engine, and a fuel pressure sensor for detecting a pressure of the fuel supplied to the fuel injector, the control apparatus adapted to control the fuel injector for driving thereof by calculating, from an operational state of the internal combustion engine and the fuel pressure detected by the fuel pressure sensor, pulse width of a pulse signal which drives the valve of the injector, wherein the control apparatus comprises a driving signal waveform command unit that is configured such that after an valve-opening command has turned on and a high valve-opening current for opening the fuel injector valve has been supplied from a high-voltage source to the fuel injector, the command unit discharges the current and after supplying from a low-voltage source a small first hold current Ih1 to allow the fuel injector to maintain the valve-open state, supplies a second hold current Ih2 which is smaller than the first hold current Ih1 to allow the fuel injector to maintain the valve-open state, the command unit being further configured such that after the valve-opening command has turned on, the command unit renders variable a hold time Thold1 during which the first hold current Ih1 will be supplied.

Because of the above system configuration, the valve of the fuel injector can be opened and closed accurately, even when the injection quantity required is small and a duration of power distribution (i.e., the pulse width of the pulse signal) to the fuel injector is short.

(8) In above item (7), the driving signal waveform command unit preferably renders the hold time Thold1 variable in accordance with at least one of two parameters, namely, the driving pulse width or the fuel pressure detected by the fuel pressure sensor; wherein, as the driving pulse width decreases, the hold time Thold1 is reduced, and as the fuel pressure lowers, the hold time Thold1 is reduced.

(9) In above item (7), the driving signal waveform command unit preferably renders a voltage Vboost of the high-voltage source variable in accordance with at least one of two parameters, namely, the driving pulse width or the fuel pressure detected by the fuel pressure sensor; wherein, as the driving pulse width decreases, the voltage Vboost of the high-voltage source is increased, and as the fuel pressure lowers, the voltage Vboost of the high-voltage source is reduced.

According to the present invention, the valve of the fuel injector can be opened and closed accurately, even when the quantity of injection required is small and the pulse duration of the driving pulse signal to the fuel injector is short.

DESCRIPTION OF THE PREFERRED EMBODIMENTS

The configuration and operation of a fuel injection control apparatus for an internal combustion engine according to a first embodiment of the present invention will be described hereunder using FIGS. 1 to 7.

First, an internal combustion engine system configuration with the fuel injection control apparatus for an internal combustion engine according to the first embodiment of the present invention will be described using FIG. 1.

Figure 1:
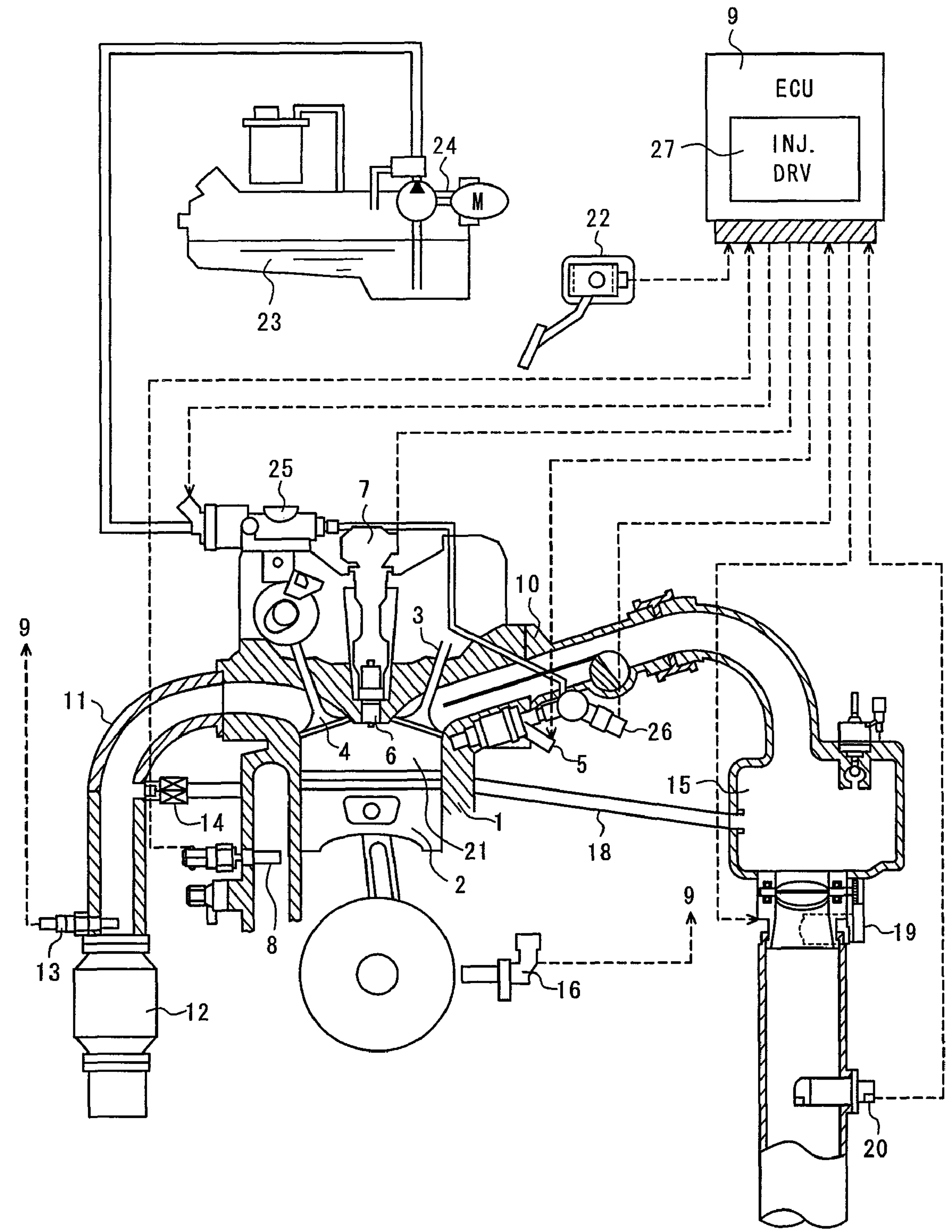
FIG. 1 is a block diagram of an internal combustion engine system with an internal combustion engine fuel injection control apparatus according to a first embodiment of the present invention.

FIG. 1 is a block diagram of the internal combustion engine system with the internal combustion engine fuel injection control apparatus according to the first embodiment of the present invention.

The engine 1 includes a piston 2, an air suction valve 3, and an exhaust valve 4. Suction air is passed through an air flowmeter (AFM) 20, then enters a throttle valve 19, and supplied from a collector 15 that is a branch section, through an air suction pipe 10 and the suction valve 3 to a combustion chamber 21 of the engine 1. Fuel is supplied from a fuel tank 23 to the internal combustion engine by a low-pressure fuel pump 24, and then the fuel is boosted up to a necessary fuel injection pressure by a high-pressure fuel pump 25. The fuel that has been boosted by the high-pressure fuel pump 25 is injected from a fuel injector 5 into the combustion chamber 21 of the engine 1, and ignited by an ignition coil 7 and an ignition plug 6. The fuel injector 5 supplies an excitation current to a coil thereof to operate a valve of the injector, thus injecting the fuel directly into the combustion chamber of the internal combustion engine. The pressure of the fuel is measured by a fuel pressure sensor 26.

After-combustion gas emissions are discharged into an exhaust pipe 11 via the exhaust valve 4. The exhaust pipe 11 has a three-way catalyst 12 for cleaning the gas emissions. An engine control unit (ECU) 9 contains a fuel injection control apparatus 27. A signal from a crank angle sensor 16 of the engine 1, an air quantity signal from the AFM 20, a signal from an oxygen sensor 13 for detecting oxygen concentration in the gas emissions, an accelerator opening angle signal from an accelerator opening angle sensor 22, a signal from the fuel pressure sensor 26, and other signals are input to the fuel injection control apparatus 27. The ECU 9 conducts an engine torque demand calculation based on the signal of the accelerator opening angle sensor 22. The ECU 9 also discriminates an idling state. In addition to a speed detector for computing the engine speed from the signal of the crank angle sensor 16, the ECU 9 further has a warm-up discriminator to analyze water temperature information of the internal combustion engine, obtained from a water temperature sensor 8, an elapsed time from a start of the engine, and other information, and judge whether the three-way catalyst 12 is in a warmed-up condition.

Furthermore, the ECU 9 calculates the quantity of suction air required for the engine 1, and outputs an appropriate opening angle signal to the throttle valve 19. Besides, the ECU 9 activates the fuel injection control apparatus 27 to calculate a fuel quantity commensurate with the suction air quantity, output a fuel injection signal to the fuel injector 5, and thus output an ignition signal to the ignition plug 6.

An exhaust gas recirculation (EGR) pathway 18 is connected between the exhaust pipe 11 and the collector 15. An EGR valve 14 is provided midway on the EGR pathway 18. An opening angle of the EGR valve 14 is controlled by the ECU 9, and the gas emissions in the exhaust pipe 11 are recirculated through the suction pipe 10 as necessary.

Next, the configuration of the internal combustion engine fuel injection control apparatus according to the present embodiment will be described using FIG. 2.

Figure 2:
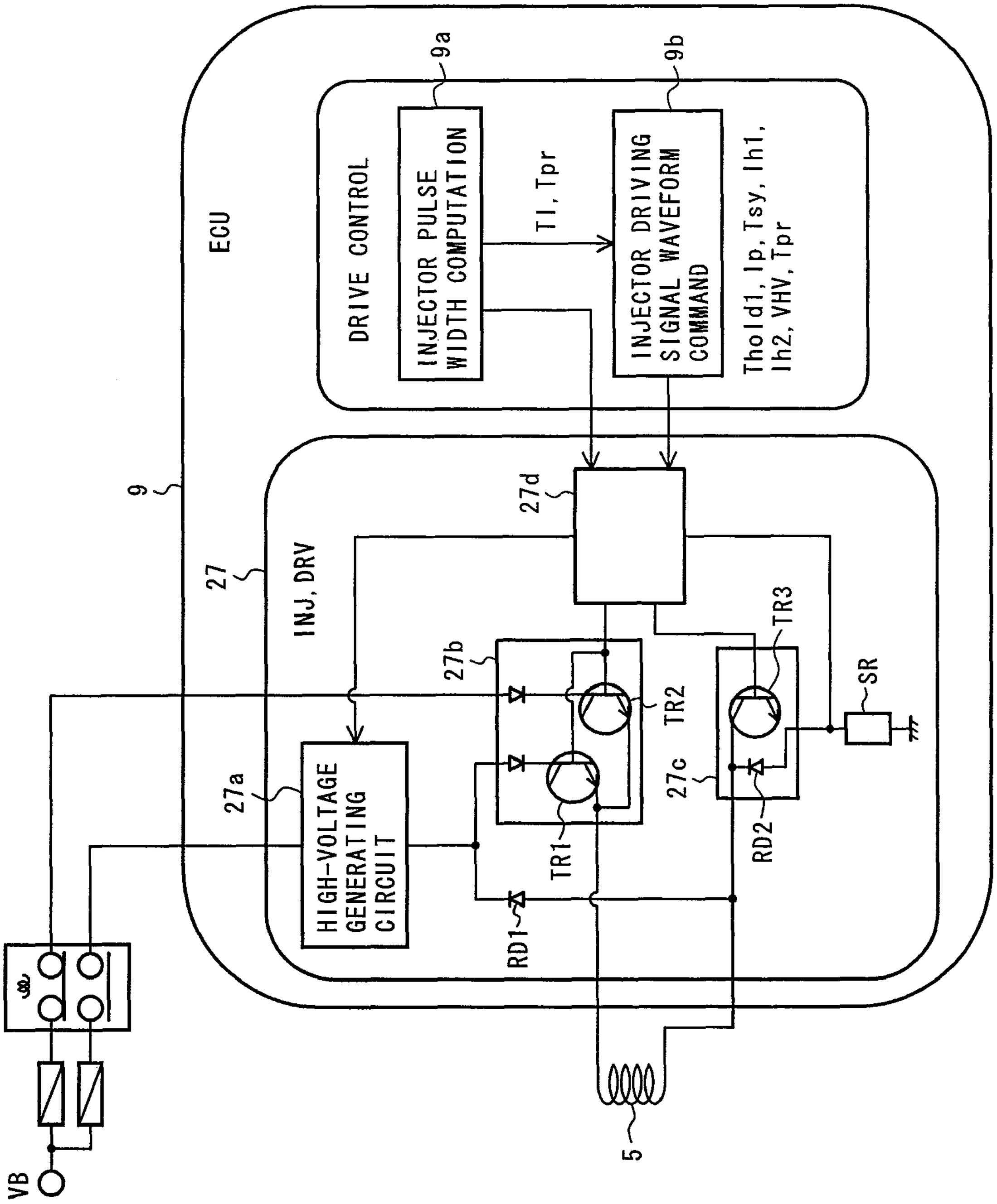
FIG. 2 is a circuit block diagram showing the configuration of the internal combustion engine fuel injection control apparatus according to the first embodiment of the present invention.

FIG. 2 is a circuit block diagram showing the configuration of the internal combustion engine fuel injection control apparatus according to the first embodiment of the present invention. The same reference numbers as used in FIG. 1 denote the same sections.

The fuel injection control apparatus 27 includes a high-voltage generating circuit 27*a*, a high-pressure fuel injector driving circuit 27*b*, a low-pressure fuel injector driving circuit 27*c*, and a driving circuit 27*d*.

The high-voltage generating circuit 27*a* generates from a battery supply voltage VB of the internal combustion engine a high supply voltage required for injector valve opening. A DC/DC converter can be used as the high-voltage generating circuit 27*a*. The high supply voltage is a desired supply voltage generated under control of the driving circuit 27*d* using a dedicated command for generating the high supply voltage. The high voltage that the high-voltage generating circuit 27*a* generates when the battery voltage VB is 14 V is 60 V, for example. A higher voltage can also be generated.

The high-pressure fuel injector driving circuit 27*b* has a high-pressure switching element TR1 and a low-pressure switching element TR2. The high-pressure fuel injector driving circuit 27*b* selects either the high supply voltage or a low supply voltage which is the battery supply voltage, depending upon a command from the driving circuit 27*d*, and supplies the selected voltage to the fuel injector 5. When the valve of the fuel injector 5 needs to be switched from a closed state to an open state, a valve-opening current required for supply of the high supply voltage is supplied, and when the valve-open state of the fuel injector needs to be maintained, the supply voltage is switched to the battery voltage and a hold current is supplied. A reverse-flow inhibition diode is connected between the high voltage generating circuit 27*a* and the high-pressure switching element Tr1 and between a supply source of the battery voltage VB and the low-pressure switching element TR2.

The low-pressure fuel injector driving circuit 27*c* includes a downstream-side switching element TR3 and a shunt resistor SR. The low-pressure fuel injector driving circuit 27*c*, as with the high-pressure fuel injector driving circuit 27*b*, is provided at a downstream side of the fuel injector in order to supply a driving current to the injector 5 under a command received from the driving circuit 27*d*. The downstream-side switching element TR3 has a parasitic diode RD2 for current recirculation. The shunt resistor SR is provided to detect the current Iinj supplied to the fuel injector 5. A value of a voltage across the shunt resistor SR is acquired into the driving circuit 27*d*.

The recirculation diode RD2 is connected between the high-pressure switching element Tr1 and the downstream-side switching element TR3.

The high-voltage generating circuit 27*a*, the high-pressure fuel injector driving circuit 27*b*, and the low-pressure fuel injector driving circuit 27*c* are drivingly controlled by the driving circuit 27*d* in order to supply a desired driving supply voltage and driving current to the fuel injector 5. A driving duration of the driving circuit 27*d* (i.e., a duration of power distribution to the fuel injector), and the driving supply voltage and driving current values are controlled by commands based on calculation results obtained in a fuel injector pulse width computing unit 9*a* and a fuel injector driving signal waveform command unit 9*b*.

The injector pulse width computing unit 9*a* outputs a fuel injection signal of a pulse width TI to the driving circuit 27*d* and the injector driving signal waveform command unit 9*b*. On the basis of the received fuel injection signal of the pulse width TI, the injector driving signal waveform command unit 9*b* outputs a first hold time Thold1, a second hold time Thold2, a first hold current Ih1, a second hold current Ih2, a peak current Ip, a rapid-discharge starting time Tsy, a high-voltage command VHV, and more. Each such time and current will be described later herein using FIG. 3 onward. The injector pulse width computing unit 9*a* may output precharge duration information Tpr, in which case, the injector driving signal waveform command unit 9*b* outputs a minus precharge duration −Tpr.

Next, the operation of the internal combustion engine fuel injection control apparatus according to the present embodiment will be described using FIGS. 3 and 4.

Figure 3:
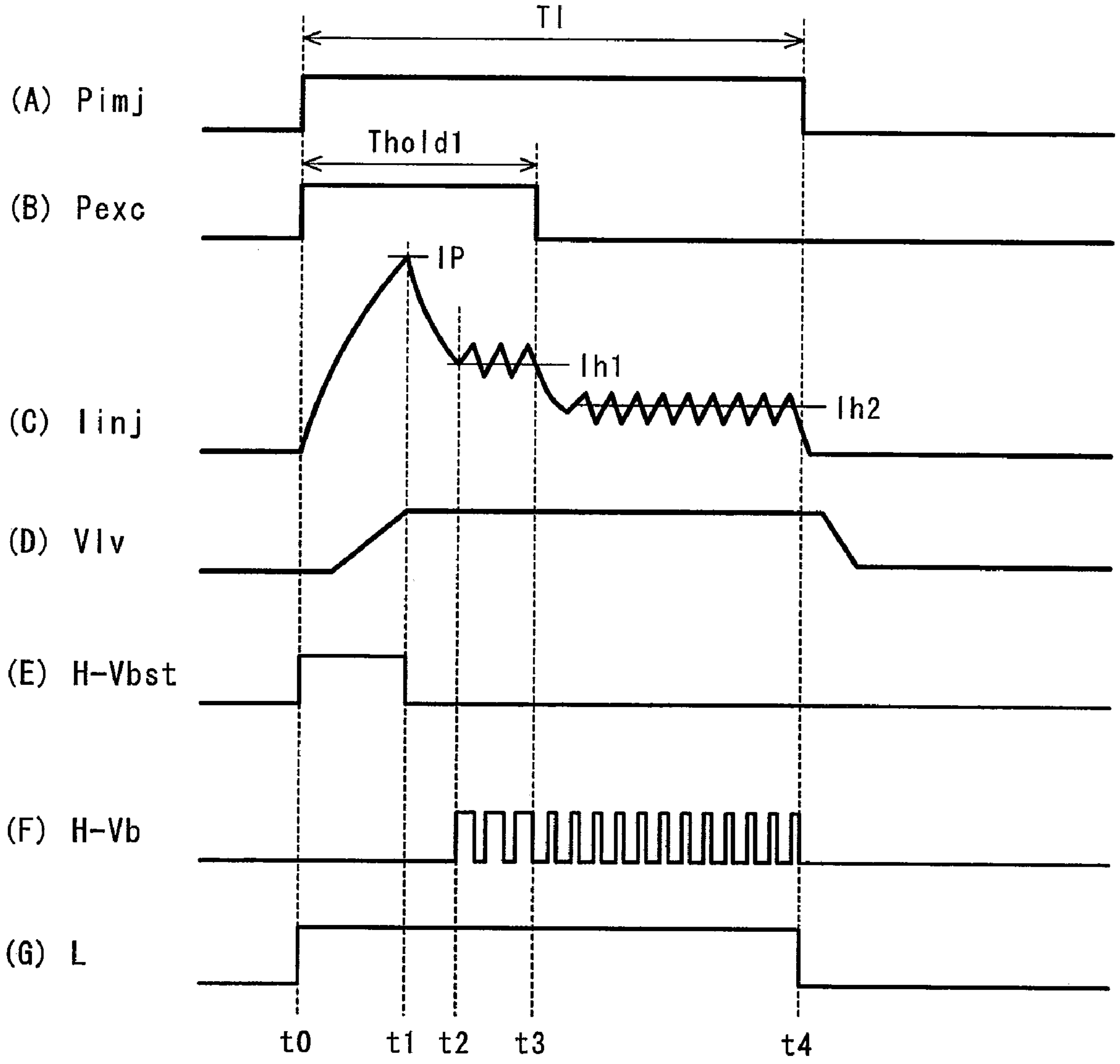
FIG. 3 is a timing chart that shows operation of the internal combustion engine fuel injection control apparatus according to the first embodiment of the present invention.
Figure 4:
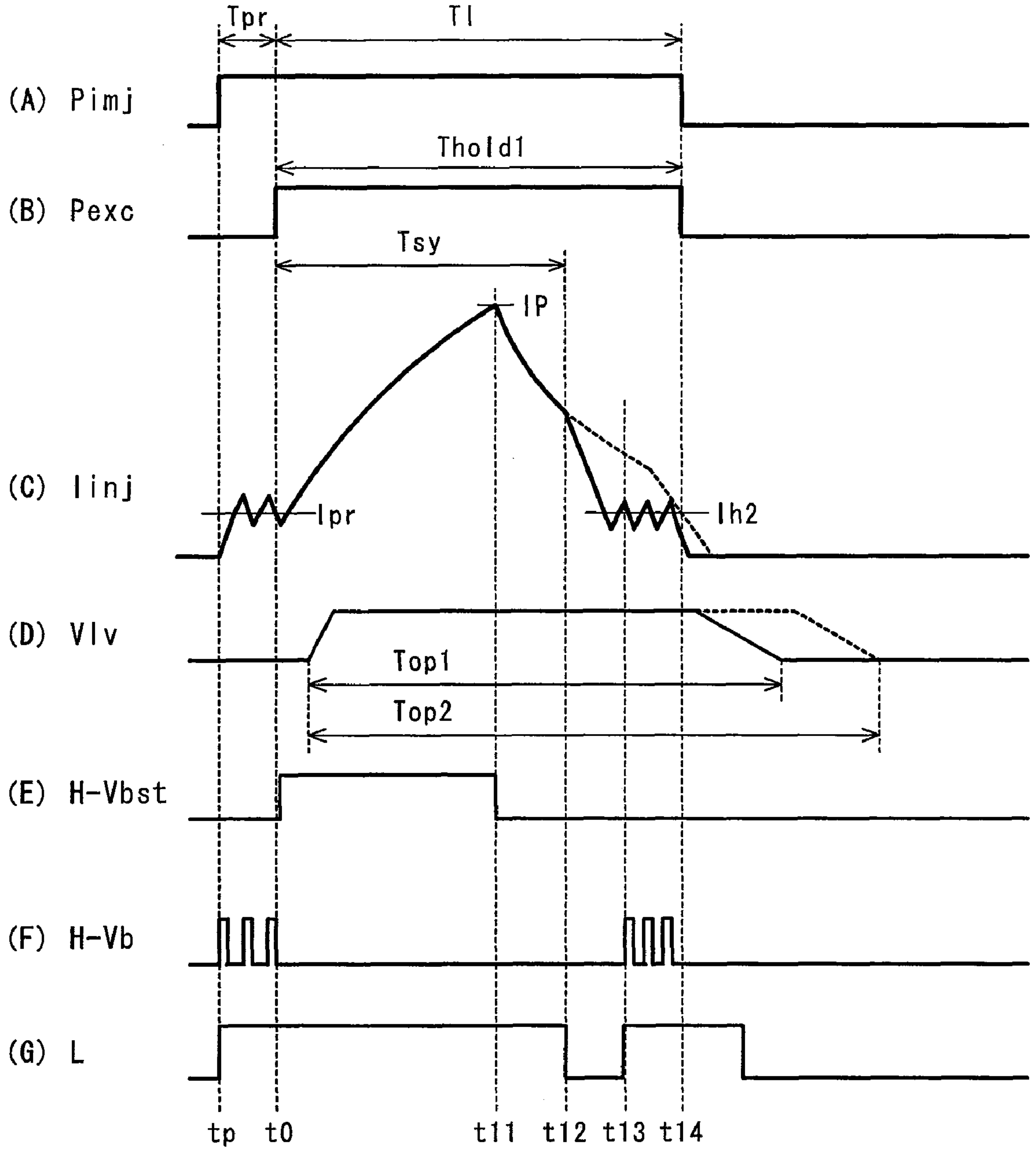
FIG. 4 is another timing chart that shows the operation of the internal combustion engine fuel injection control apparatus according to the first embodiment of the present invention.

FIGS. 3 and 4 are timing charts showing the operation of the internal combustion engine fuel injection control apparatus according to the first embodiment of the present invention. FIG. 3 shows the operation applying to a case that the fuel injection pulse width is large. FIG. 4 shows the operation applying to a case that the fuel injection pulse width is small. A horizontal axis in FIG. 4 denotes time in enlarged form relative to that of FIG. 3.

First, the operation applying to the case that the fuel injection pulse width is large is described below using FIG. 3. The horizontal axes in sections (A) to (G) of FIG. 3 denote time. A vertical axis in section (A) of FIG. 3 denotes the fuel injection pulse signal Pinj of the pulse width TI, calculated by the injector pulse width computing unit 9*a* of FIG. 2 and output to the driving circuit 27*d* in accordance with the calculated value. A vertical axis in section (B) of FIG. 3 denotes a pulse signal Pexc of the first hold time Thold1, calculated by the injector driving signal waveform command unit 9*b* of FIG. 2 and output to the driving circuit 27*d* in accordance with the calculated value. A vertical axis in section (C) of FIG. 3 denotes the injector driving current Iinj detected by the shunt resistor SR of FIG. 2. A vertical axis in section (D) of FIG. 3 denotes a valve lift quantity Vlv of the fuel injector 5 of FIG. 2. A vertical axis in section (E) of FIG. 3 denotes a high-pressure boost pulse signal H-Vbst supplied from the driving circuit 27*d* of FIG. 2 to the high-pressure switching element Tr1 of the high-pressure fuel injector driving circuit 27*b*. A vertical axis in section (F) of FIG. 3 denotes a high-pressure battery voltage pulse signal H-Vb supplied from the driving circuit 27*d* of FIG. 2 to the low-pressure switching element TR2 of the high-pressure fuel injector driving circuit 27*b*. A vertical axis in section (G) of FIG. 3 denotes a low-pressure pulse signal L supplied from the driving circuit 27*d* of FIG. 2 to the switching element TR3 of the low-pressure fuel injector driving circuit 27*c*.

As shown in section (A) of FIG. 3, at time t0, the injector pulse width computing unit 9*a* outputs the fuel injection pulse signal Pinj of the pulse width TI, thus turning on a valve-opening command. The present embodiment assumes that the pulse width TI of the fuel injection pulse signal at this time is variable in a range, for example, from 0.6 ms to 5.0 ms. The case that the fuel injection pulse width is large applies when the pulse width TI is in a range, for example, from 0.8 ms to 5.0 ms.

At the time t0, the injector driving signal waveform command unit 9*b* outputs the pulse signal Pexc of the first hold time Thold1, as shown in section (B) of FIG. 3. The first hold time Thold1 is, for example, 0.6 ms or more, and is variable according to the fuel injection pulse width TI. That is to say, as the fuel injection pulse width TI is narrowed, the first hold time Thold1 becomes shorter.

As shown in section (E) of FIG. 3, at the time t0, when the fuel injection pulse signal Pinj of the pulse width TI turns on, the driving circuit 27*d* turns on the high-pressure boost pulse signal H-vbst supplied to the high-pressure switching element Tr1 of the high-pressure fuel injector driving circuit 27*b*. As shown in section (G) of FIG. 3, the driving circuit 27*d* also turns on the low-pressure pulse signal L supplied to the switching element TR3 of the low-pressure fuel injector driving circuit 27*c*. Thus, the high voltage from the high-voltage generating circuit 27*a* is supplied to the fuel injector 5, hence causing a flow of the fuel injector driving current Iinj, as shown in section (C) of FIG. 3.

When the fuel injector driving current Iinj increases to the current level required for valve opening of the fuel injector 5, the valve lift quantity Vlv thereof increases, as shown in section (D) of FIG. 3, and the fuel injector 5 begins to open the valve.

At time t1, upon detecting that the fuel injector driving current Iinj detected by the shunt resistor SR has reached the previously set high peak current Ip required for valve opening, the driving circuit 27*d* turns off the high-pressure boost pulse signal H-Vbst supplied to the high-pressure switching element TR1 of the high-pressure fuel injector driving circuit 27*b*. Section (E) of FIG. 3 shows the turn-off state of the signal H-Vbst. The turn-off of H-Vbst reduces the fuel injector driving current Iinj, as shown in section (C) of FIG. 3. The peak current Ip is 10 A, for example.

At time t2, upon detecting that the fuel injector driving current Iinj detected by the shunt resistor SR has reached the previously set first hold current Ih1, the driving circuit 27*d* turns on and off the high-pressure battery voltage pulse signal H-Vb supplied therefrom to the low-pressure switching element TR2 of the high-pressure fuel injector driving circuit 27*b*. Section (F) of FIG. 3 shows the turn-off state of the signal H-Vb. The fuel injector driving current Iinj is thus controlled for the injector to maintain the first hold current Ih1.

The first hold current Ih1 is a relatively high excitation current (hold current) that allows the fuel injector 5 to reliably maintain the valve-open state, and this current is greater than the second hold current Ih2 described later herein, and is 4 A, for example.

Even under an environment of a high fuel pressure applied to the fuel injector, the internal valve thereof can be reliably opened by supplying the fuel injector driving current Iinj until the peak current Ip has been reached. Also, maintaining the fuel injector driving current Iinj at the relatively high first hold current Ih1 allows the internal valve of the fuel injector to be held in the open state, even under the environment of the high fuel pressure applied to the fuel injector.

Next, at time t3, upon the turn-off of the pulse signal Pexc of the first hold time Thold1 in section (B) of FIG. 3, the driving circuit 27*d* turns on and off the high-pressure battery voltage pulse signal H-Vb supplied therefrom to the low-pressure switching element TR2 of the high-pressure fuel injector driving circuit 27*b*. Section (F) of FIG. 3 shows the turn-off state of the signal H-Vb. The fuel injector driving current Iinj is consequently controlled to maintain the second hold current Ih2.

The second hold current Ih2 is a small excitation current (hold current) that allows the fuel injector 5 to barely maintain the valve-open state, and this current is 2.5 A, for example.

After that, at time t4, upon the turn-off of the fuel injection pulse signal Pinj of the pulse width TI in section (A) of FIG. 3, the high-pressure battery voltage pulse signal H-Vb supplied from the driving circuit 27*d* to the low-pressure switching element TR2 of the high-pressure fuel injector driving circuit 27*b* is turned off as shown in section (F) of FIG. 3. At the same time, the low-pressure pulse signal L supplied from the driving circuit 27*d* to the switching element TR3 of the low-pressure fuel injector driving circuit 27*c* is turned off as shown in section (G) of FIG. 3. Thus, as shown in section (C) of FIG. 3, the fuel injector driving current Iinj is shut off, and as shown in section (D) of FIG. 3, the valve lift quantity Vlv of the fuel injector 5 decreases to close the injector 5.

Changeover signal Thold1 of the fuel injector driving current is a pulse signal generated on the basis of the value that the fuel injector driving signal waveform command unit 9*b* in FIG. 2 has calculated, and the pulse signal controls changeover timing of the current value supplied to the injector. The injector driving pulses TI and Thold1 are used to supply to the injector 5 the high current Ip required for the injector to open the valve, and then control the current Ip to the relatively high first hold current Ih1 by attenuating that current value to reliably maintain the valve-open state until the injector driving current changeover signal Thold1 has been turned on. During the time from turn-off of the injector driving current changeover signal Thold1 to the turn-on duration of the injector driving pulse TI, the injector is controlled using the relatively small second hold current Ih2, and upon the turn-off of the injector driving pulse TI, the flow of the current is shut off at once.

Next, the operation applying when the fuel injection pulse width is small is described below with reference to FIG. 4. Vertical axes in sections (A) to (G) of FIG. 4 denote the same as those of sections (A) to (G) of FIG. 3.

As shown in section (A) of FIG. 4, at time t0, the injector pulse width computing unit 9*a* outputs the fuel injection pulse signal Pinj of the pulse width TI. The present embodiment assumes that the pulse width TI of the fuel injection pulse signal at this time is variable in a range, for example, from 0.6 ms to 5.0 ms. The case that the fuel injection pulse width is small applies when the pulse width TI ranges, for example, from 0.6 ms to 0.8 ms. An example in which the pulse width TI is 0.6 ms, for example, is shown in section (A) of FIG. 4.

At the time t0, the injector driving signal waveform command unit 9*b* outputs the pulse signal Pexc of the first hold time Thold1, as shown in section (B) of FIG. 4. The first hold time Thold1 is, for example, 0.6 ms, which is a fixed value.

During the time from tp to t0, as shown in section (A) of FIG. 4, the precharge pulse Tpr is output. This will be described later herein.

As shown in section (E) of FIG. 4, at the time t0, when the fuel injection pulse signal Pinj of the pulse width TI turns on, the driving circuit 27*d* turns on the high-pressure boost pulse signal H-vbst supplied to the high-pressure switching element TR1 of the high-pressure fuel injector driving circuit 27*b*. As shown in section (G) of FIG. 4, the driving circuit 27*d* also turns on the low-pressure pulse signal L supplied to the switching element TR3 of the low-pressure fuel injector driving circuit 27*c*. Thus, the high voltage from the high-voltage generating circuit 27*a* is supplied to the fuel injector 5, hence causing a flow of the fuel injector driving current Iinj, as shown in section (C) of FIG. 4.

When the fuel injector driving current Iinj increases to the current level required for valve opening of the fuel injector 5, the valve lift quantity Vlv thereof increases as shown in section (D) of FIG. 4, and the fuel injector 5 begins to open the valve.

At time t11, upon detecting that the fuel injector driving current Iinj detected by the shunt resistor SR has reached the previously set peak current Ip required for valve opening, the driving circuit 27*d* turns off the high-pressure boost pulse signal H-Vbst supplied to the high-pressure switching element Tr1 of the high-pressure fuel injector driving circuit 27*b*. Section (E) of FIG. 4 shows the turn-off state of the signal H-Vbst. The turn-off of H-Vbst reduces the fuel injector driving current Iinj, as shown in section (C) of FIG. 4. The peak current Ip is 10 A, for example.

Even under the environment of the high fuel pressure applied to the fuel injector, the internal valve thereof can be reliably opened by supplying the fuel injector driving current Iinj until the peak current Ip has been reached.

As shown in section (G) of FIG. 4, at time t12, upon a lapse of the rapid-discharge starting time Tsy set in the injector driving signal waveform command unit 9*b* of FIG. 2, the driving circuit 27*d* turns off the low-pressure pulse signal L supplied to the switching element TR3 of the low-pressure fuel injector driving circuit 27*c*. Thus, the current in the injector 5 is recirculated by the recirculation diode RD1 of FIG. 2 to return to the high-voltage generating circuit 27*a*, and as a result, this current is rapidly discharged for a more rapid decrease than during the t11-t12 time. The rapid-discharge starting time Tsy is, for example, from 0.50 to 0.55 ms. As will be described in further detail later herein using FIG. 5, the rapid-discharge starting time Tsy is variable according to the particular fuel injection pulse width TI and fuel pressure.

At time t13, upon detecting that the fuel injector driving current Iinj detected by the shunt resistor SR has reached the previously set second hold current Ih2 at which the valve-open state can be maintained, the driving circuit 27*d* turns on the low-pressure pulse signal L supplied to the switching element TR3 of the low-pressure fuel injector driving circuit 27*c*. Section (G) of FIG. 4 shows the turn-on state of the signal L. In addition, as shown in section (F) of FIG. 4, the driving circuit 27*d* turns on and off the high-pressure battery voltage pulse signal H-Vb supplied therefrom to the low-pressure switching element TR2 of the high-pressure fuel injector driving circuit 27*b*. Thus, the fuel injector driving current Iinj is controlled for the injector to maintain the second hold current Ih2. The second hold current Ih2 is a small excitation current (hold current) that allows the fuel injector 5 to barely maintain the valve-open state, and this current is 2.5 A, for example.

At time t14, upon the turn-off of the injection pulse signal Pinj of the pulse width TI that is shown in section (A) of FIG. 4, the high-pressure battery voltage pulse signal H-Vb supplied from the driving circuit 27*d* to the low-pressure switching element TR2 of the high-pressure fuel injector driving circuit 27*b* turns off, as shown in section (F) of FIG. 4, and at the same time, as shown in section (G) of FIG. 4, the low-pressure pulse signal L supplied from the driving circuit 27*d* to the switching element TR3 of the low-pressure fuel injector driving circuit 27*c* also turns off. Thus, as shown in section (C) of FIG. 4, the fuel injector driving current Iinj is interrupted, and as shown in section (D) of FIG. 4, the valve lift quantity Vlv of the fuel injector 5 decreases to close the injector 5.

In sections (C) and (D) of FIG. 4, broken lines denote the injector driving current Iinj and injector valve lift quantity Vlv of the injector 5 existing in a case that the rapid discharge does not occur at the time t12.

In the present example, when the injector driving pulse signal is shorter than a required level, the current to the injector is rapidly discharged for a steep decrease after the rapid-discharge starting time Tsy from the high-voltage supply timing at the time t0. In this case, the first hold current Ih1 described in FIG. 3 is not supplied and the second hold current Ih2 is controlled. Thus, in comparison with the case denoted by the broken lines in sections (C) and (D) of FIG. 4, in a case denoted by solid lines, since the second hold current Ih2 is supplied in the turn-off timing of the injector driving pulse signal at time t14, the valve-closing operation of the injector from the turn-off timing becomes fast as shown in section (D) of FIG. 4. That is to say, the opening duration of the valve can be shortened from time Top2 to time Top1. This, in turn, makes stable injector valve closing possible, even when the injector driving pulse signal is shorter than the required level.

Next, the reason why the precharge period Tpr is provided is described below. During valve-closing control of the fuel injector, even when the injector driving pulse is short, stable injector valve closing can be achieved by rapidly discharging the injector current after the elapse of the rapid-discharge starting time Tsy. The precharge period Tpr is used to stabilize the injector valve-closing operation.

If the fuel pressure upon the fuel injector is increased by suppressing the current required for the injector to open the valve, the particular timing of the rapid-discharge starting time Tsy may not allow stable injector valve closing to be controlled. In order to improve this inconvenience, during the precharge period Tpr shown in section (A) of FIG. 4, the driving circuit 27*d* turns on the low-pressure pulse signal L supplied to the switching element TR3 of the low-pressure fuel injector driving circuit 27*c*. Section (G) of FIG. 4 shows the turn-on state of the pulse signal L. In addition, as shown in section (F) of FIG. 4, the driving circuit 27*d* turns on and off the high-pressure battery voltage pulse signal H-Vb supplied therefrom to the low-pressure switching element TR2 of the high-pressure fuel injector driving circuit 27*b*. Thus, the fuel injector driving current Iinj is controlled for the injector to maintain the precharge current Ipr. The precharge current Ipr is an excitation current as small as it does not allow valve opening of the fuel injector 5, and this current is 2.0 A, for example.

Consequently, as shown in section (C) of FIG. 4, the fuel injector driving current Iinj is held in a level of the precharge current Ipr during the tp−t0 time. The precharge current Ipr is used to compensate for the discharge of the injector driving current, started with the rapid-discharge starting time Tsy, or for a decrease in the injector driving current due to canceling the supply of the first hold current Ih1.

At the time t0, upon the turn-on of the fuel injection pulse signal Pinj of the pulse width TI, the injector driving current Iinj rapidly flows as shown in section (C) of FIG. 4, and as shown in section (D) of FIG. 4, the valve lift quantity Vlv of the injector 5 increases and the injector 5 starts to open the valve. The solid line in section (D) of FIG. 4 denotes the quantity of valve lifting by the fuel injector 5 with the precharge current on, and the broken line denotes the quantity of valve lifting by the fuel injector 5 with the precharge current off.

In this way, a precharge current as small as it does not allow valve opening of the fuel injector is supplied before fuel injection is actually started. This makes stable control of injector valve opening possible.

Whether the precharge current is supplied at this time is determined by the fuel injector driving pulse width. For example, the precharge is executed when the driving pulse width TI is 0.8 ms or less. Alternatively, whether the precharge current is supplied is determined by the fuel pressure. For example, the precharge is executed when the fuel pressure is 12 MPa or more.

In addition, in order to realize stable control of injector valve opening, the precharge current supply time or the precharge current value is set on the basis of the fuel injector valve driving pulse width or the fuel pressure. A longer precharge time or a higher precharge current is assigned for a shorter injection pulse width, or a longer precharge time or a higher precharge current is assigned for a higher fuel pressure.

It suffices just to control at least one of two parameters, namely, the precharge time or the precharge current, and if the fuel injection quantity that the internal combustion engine demands is satisfied, the precharge time or the precharge current can also be a fixed time or a fixed current value.

Next, the rapid-discharge starting time Tsy used in the internal combustion engine fuel injection control apparatus of the present embodiment will be described below using FIG. 5.

Figure 5:
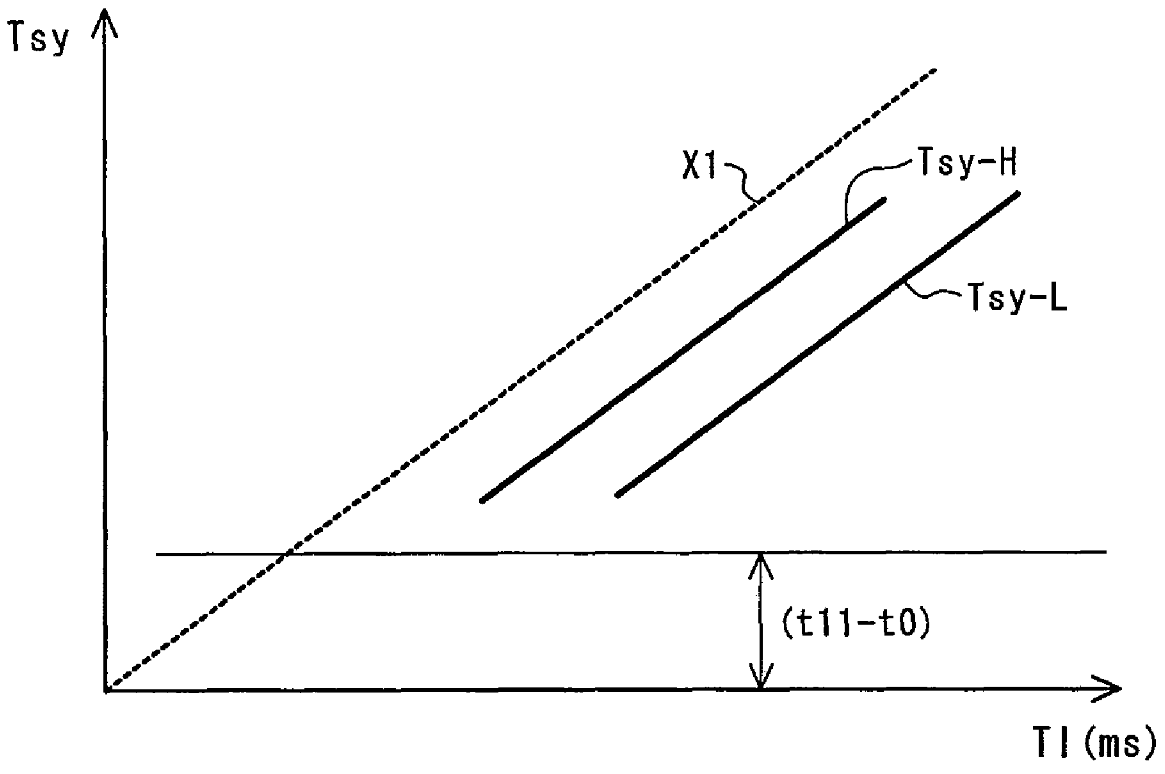
FIG. 5 is an illustrative diagram of a rapid-discharge starting time used in the internal combustion engine fuel injection control apparatus according to the first embodiment of the present invention.

FIG. 5 is an illustrative diagram of the rapid-discharge starting time Tsy used in the internal combustion engine fuel injection control apparatus according to the first embodiment of the present invention.

A horizontal axis in FIG. 5 denotes the fuel injection pulse width TI, and a vertical axis denotes the rapid-discharge starting time Tsy. A broken line in the figure is a virtual line indicating that the rapid-discharge starting time Tsy is equivalent to the fuel injection pulse width TI.

A solid line Tsy-H in FIG. 5 represents a relationship of the rapid-discharge starting time Tsy with respect to the fuel injection pulse width TI obtained at a high fuel pressure. A solid line Tsy-L represents a relationship of the rapid-discharge starting time Tsy with respect to the fuel injection pulse width TI obtained at a low fuel pressure. Although the relationships between the fuel injection pulse width TI and rapid-discharge starting time Tsy obtained at two different fuel pressures are represented in FIG. 5, the relationship between the fuel injection pulse width TI and rapid-discharge starting time Tsy obtained at an actual fuel pressure is changed even more closely or precisely according to fuel pressure.

As denoted by the solid lines Tsy-H and Tsy-L, the rapid-discharge starting time Tsy is shorter than the fuel injection pulse width TI. Also, the rapid-discharge starting time Tsy is longer than the t11−t0 time shown in FIG. 4, that is, the Ip attainment time from the turn-on of the fuel injection pulse signal Pinj to an arrival of the resulting fuel injector driving current Iinj at the peak current Ip. Thus, as shown in FIG. 4, rapid discharging becomes possible after the fuel injector driving current Iinj has reached the peak current Ip, that is, after the injector valve has fully opened.

In addition, as denoted by the solid lines Tsy-H and Tsy-L, the rapid-discharge starting time Tsy is extended as the fuel injection pulse width TI increases, or is reduced as TI decreases. Furthermore, as denoted by the solid lines Tsy-H and Tsy-L, the rapid-discharge starting time Tsy is extended as the fuel pressure increases. Thus, stable valve opening and closing operation of the fuel injector can be obtained.

The rapid-discharge starting time Tsy is calculated using an arithmetic expression or map based on at least one of two parameters, namely, the fuel injection pulse width or the fuel pressure. The rapid-discharge starting time Tsy can be a fixed value if the fuel injection quantity that the internal combustion engine demands is satisfied.

Next, control by the internal combustion engine fuel injection control apparatus of the present embodiment will be described below using FIG. 6.

Figure 6:
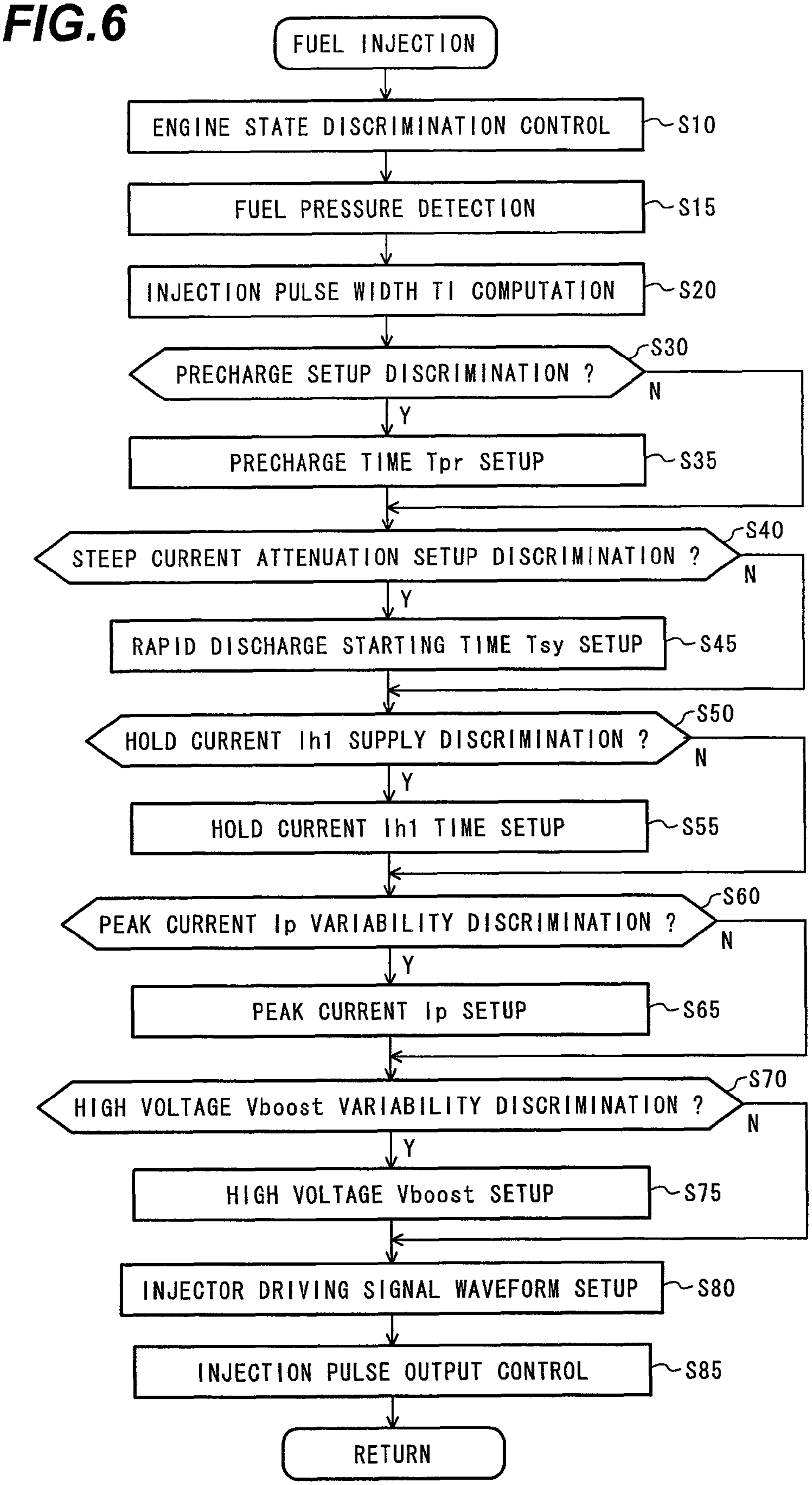
FIG. 6 is a flowchart of control by the internal combustion engine fuel injection control apparatus according to the first embodiment of the present invention.

FIG. 6 is a flowchart of control by the internal combustion engine fuel injection control apparatus according to the first embodiment of the present invention.

In step S10, the ECU 9 discriminates an operational state of the internal combustion engine.

Next, the ECU 9 detects the fuel pressure of the internal combustion engine in step S15.

Next, in step S20, the fuel injector pulse width computing unit 9*a* calculates, from the information that was obtained in discrimination and detection steps S10 and S15, the driving pulse width TI of the fuel injector so that a desired air-fuel ratio is obtained.

Next, in step S30, the ECU 9 judges whether to set the precharge for supplying the precharge current Ipr of FIG. 4 to the fuel injector. When the precharge is to be set, the fuel injector pulse width computing unit 9*a* assigns the precharge current and the precharge time, in step S35. The precharge current Ipr and precharge time Tpr shown in FIG. 4 are assigned in this process of step S35.

Next, in step S40, the ECU 9 judges whether the current to the fuel injector described per FIG. 4 is to be discharged rapidly. When the rapid discharge is to be conducted, the injector driving signal waveform command unit 9*b* assigns the rapid-discharge starting time Tsy in step S45. The rapid-discharge starting time Tsy shown in FIG. 4 is assigned in this process of step S45.

Next, in step S50, the ECU 9 judges whether the first hold current Ih1 of the fuel injector in FIG. 3 is to be supplied and whether a variable supply time is to be assigned. When these are necessary, the fuel injector driving signal waveform command unit 9*b* assigns the first hold current Ih1 and the supply time Thold1 in step S55. The first hold current Ih1 and supply time Thold1 shown in FIG. 3 are assigned in this process of step S55. The example in FIG. 4 assumes that the first hold current Ih1 is not assigned.

The hold current supply time Thold1 here has its upper limit assigned to be shorter than the fuel injection driving pulse width, and has its lower limit assigned to be longer than the time required for the arrival at the valve-opening current Ip. Also, the first hold current Ih1 is calculated using both the fuel injector driving pulse width TI (obtained in step S20) and the fuel pressure value (obtained in step S15), or using at least one of these two parameters. The calculation method at this time can use a calculation expression or use a previously map-assigned value.

Next, in step S60, the ECU 9 judges whether the valve-opening current Ip to the fuel injector is to be assigned as a variable value. The assignment of the variable valve-opening current Ip will be described later herein using FIG. 10. When the assignment is necessary, the variable valve-opening current value Ip is assigned in step S65. The example in FIG. 4 assumes that the variable valve-opening current Ip is not assigned.

The valve-opening current Ip here has its upper limit assigned to be a value that allows driving at the highest possible speed by the injector. Also, the current Ip has its lower limit assigned to be a value great enough for the injector to open the valve. The valve-opening current Ip is calculated using both the fuel injector driving pulse width TI (obtained in step S20) and the fuel pressure value (obtained in step S15), or using at least one of these two parameters.

Next, in step S70, the ECU 9 judges whether a setting of the high voltage (Vboost) supplied to the fuel injector is to be changed. A variable-setting change of this high voltage (Vboost) will be described later herein using FIG. 9. When the setting change is necessary, a new variable voltage value is assigned to the high voltage (Vboost) in step S75. The example in FIG. 4 assumes that a variable high voltage is not assigned.

In step S80, the driving circuit 27*d* sets the fuel injector driving signal waveform (shown in FIG. 3 or 4), and in step S85, the driving circuit 27*d* controls fuel injection pulse output.

Next, flow characteristics of the fuel injector in the internal combustion engine fuel injection control apparatus of the present embodiment will be described below using FIG. 7.

Figure 7:
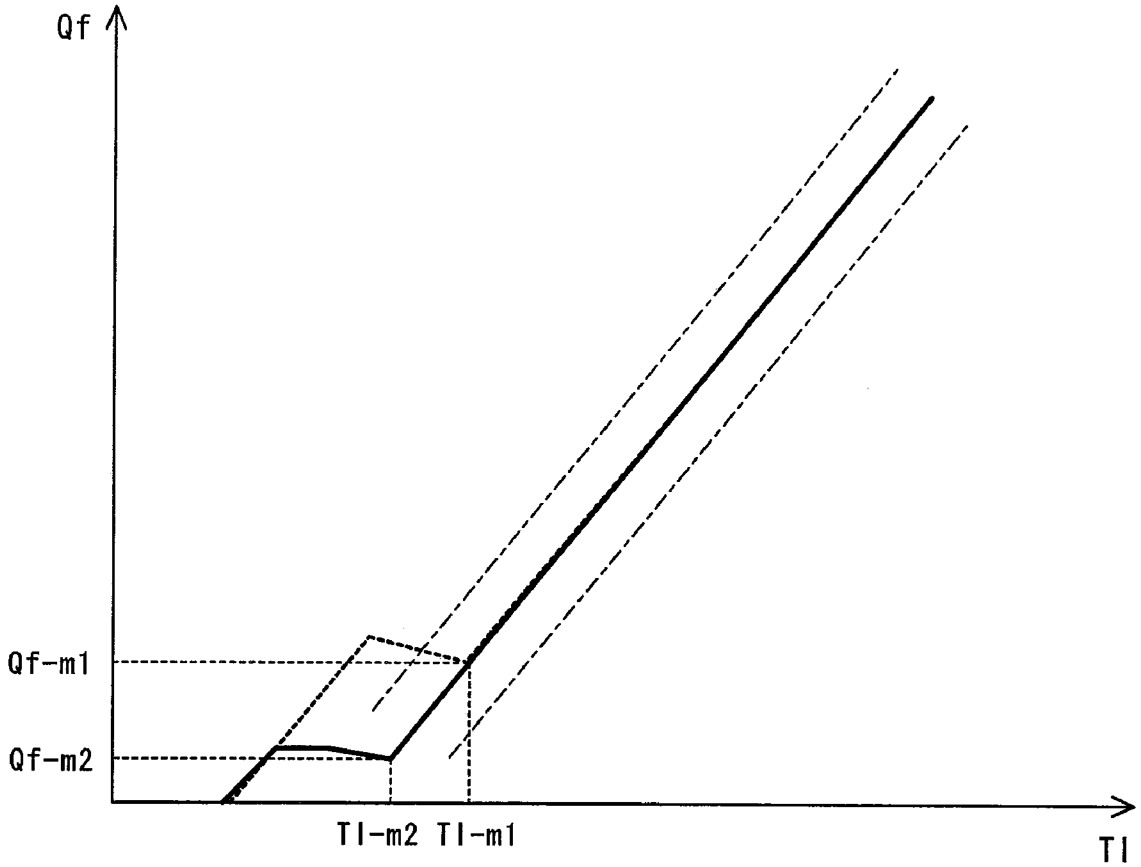
FIG. 7 is a flow characteristics diagram of a fuel injector in the internal combustion engine fuel injection control apparatus according to the first embodiment of the present invention.

FIG. 7 is a flow characteristics diagram of the fuel injector in the internal combustion engine fuel injection control apparatus according to the first embodiment of the present invention. In FIG. 7, a horizontal axis denotes the fuel injection pulse width TI and a vertical axis denotes the fuel injection flow rate QF A broken line in the figure represents a flow characteristics curve of a conventional fuel injector. That is to say, in a range that a fuel injection pulse width TI is greater than a minimum pulse width TI−m1, a fuel injection flow rate Qf increases in proportion to increases in the fuel injection pulse width TI. When the fuel injection pulse width TI is smaller than the minimum pulse width TI−m1, however, the fuel injection flow rate Qf increases, despite decreases in the fuel injection pulse width TI. For example, the minimum pulse width TI=m1 is 0.8 ms and the fuel injection flow rate Qf−m1 associated therewith is 7 $mm^3$/stroke.

In the present embodiment, on the other hand, the operation of the fuel injector stabilizes since the valve thereof is closed at a fixed driving current value without being affected by the fuel injector driving pulse width. That is to say, because of such fuel injection control as shown in FIG. 4, in the range that the fuel injection pulse width TI of the conventional fuel injector is greater than a minimum pulse width TI−m2 greater than the minimum pulse width TI−m1, the fuel injection flow rate Qf increases in proportion to increases in the fuel injection pulse width TI. Therefore, fuel flow rate control becomes possible, even in the range from the minimum pulse width TI−m1 to the minimum pulse width TI−m2. For example, the minimum pulse width TI−m2 is 0.6 ms and a fuel injection flow rate Qf−m1 associated therewith is 5 $mm^3$/stroke.

As set forth above, according to the present embodiment, the valve of the fuel injector can be opened and closed accurately, even when the injection quantity required is small and the duration of power distribution to the fuel injector is short.

The configuration and operation of a fuel injection control apparatus for an internal combustion engine according to a second embodiment of the present invention will be described hereunder using FIG. 8. The description assumes that an internal combustion engine system configuration with the internal combustion engine fuel injection control apparatus according to the present embodiment is essentially the same as the system configuration shown in FIG. 1. The description also assumes that the configuration of the internal combustion engine fuel injection control apparatus according to the present embodiment is essentially the same as the system configuration shown in FIG. 2. In addition, the description assumes that the operation of the internal combustion engine fuel injection control apparatus, achieved in the present embodiment when the fuel injection pulse width is large, is essentially the same as the system configuration shown in FIG. 3. Furthermore, the description assumes that control by the internal combustion engine fuel injection control apparatus according to the present embodiment is essentially the same as the control sequence shown in FIG. 6.

Next, the operation of the internal combustion engine fuel injection control apparatus, achieved in the present embodiment when the fuel injection pulse width is small, will be described using FIG. 8.

Figure 8:
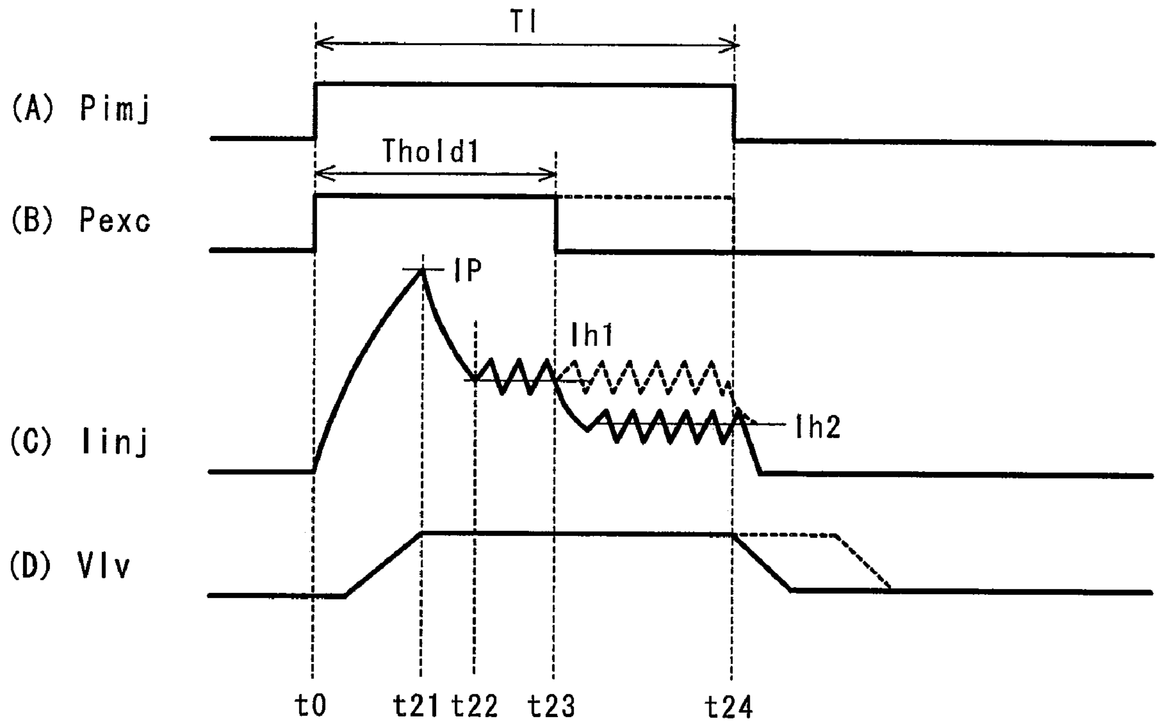
FIG. 8 is a timing chart that shows operation of an internal combustion engine fuel injection control apparatus according to a second embodiment of the present invention.

FIG. 8 is a timing chart showing the operation of the internal combustion engine fuel injection control apparatus according to the second embodiment of the present invention. Vertical axes in sections (A) to (D) of FIG. 8 denote the same as that of the vertical axes shown in sections (A) to (D) of FIG. 3.

As shown in section (A) of FIG. 8, at time t0, the injector pulse width computing unit 9*a* outputs the fuel injection pulse signal Pinj of the pulse width TI. The present embodiment assumes that the pulse width TI of the fuel injection pulse signal at this time is variable in the range, for example, from 0.6 ms to 5.0 ms. This example applies when the fuel injection pulse width is small, that is, when the pulse width TI is in a range, for example, from 0.6 ms to 0.8 ms. More specifically, the example applies when the pulse width TI is 0.6 ms.

In addition, at the time t0, the injector driving signal waveform command unit 9*b* outputs the pulse signal Pexc of the first hold time Thold1, as shown in section (B) of FIG. 8. While, in the example of FIG. 4, the first hold time Thold1 has been fixed at, for example, 0.6 ms, the first hold time Thold1 in the present embodiment is variable according to the pulse width TI, that is, variable in a range from 0.45 ms to 0.55 ms.

Other operation is essentially the same as in the case of FIG. 3 that the pulse width TI is large. That is to say, as shown in section (E) of FIG. 3, at the time t0, when the fuel injection pulse signal Pinj of the pulse width TI turns on, the driving circuit 27*d* turns on the high-pressure boost pulse signal H-vbst supplied to the high-pressure switching element Tr1 of the high-pressure fuel injector driving circuit 27*b*. As shown in section (G) of FIG. 3, the driving circuit 27*d* also turns on the low-pressure pulse signal L supplied to the switching element TR3 of the low-pressure fuel injector driving circuit 27*c*. Thus, the high voltage from the high-voltage generating circuit 27*a* is supplied to the fuel injector 5, hence causing a flow of the fuel injector driving current Iinj, as shown in section (C) of FIG. 8.

When the fuel injector driving current Iinj increases to the current level required for valve opening of the fuel injector 5, the valve lift quantity Vlv thereof increases, as shown in section (D) of FIG. 8, and the fuel injector 5 begins to open the valve.

At time t21, upon detecting that the fuel injector driving current Iinj detected by the shunt resistor SR has reached the previously set high peak current Ip required for valve opening, the driving circuit 27*d* turns off the high-pressure boost pulse signal H-Vbst supplied to the high-pressure switching element TR1 of the high-pressure fuel injector driving circuit 27*b*. Section (E) of FIG. 3 shows the turn-off state of the signal H-Vbst. The turn-off of H-Vbst reduces the fuel injector driving current Iinj, as shown in section (C) of FIG. 8. The peak current Ip is 10 A, for example.

At time t22, upon detecting that the fuel injector driving current Iinj detected by the shunt resistor SR has reached the previously set first hold current Ih1, the driving circuit 27*d* turns on and off the high-pressure battery voltage pulse signal H-Vb supplied therefrom to the low-pressure switching element TR2 of the high-pressure fuel injector driving circuit 27*b*. Section (F) of FIG. 3 shows the turn-on and the turn-off state of the signal H-Vb. The fuel injector driving current Iinj is thus controlled for the injector to maintain the first hold current Ih1.

The first hold current Ih1 is a relatively high excitation current (hold current) that allows the fuel injector 5 to reliably maintain the valve-open state, and this current is greater than the second hold current Ih2 described later herein, and is 4 A, for example. The first hold current value Ih1 and the supply time Thold1 are assigned in the process of step S55 in FIG. 6.

Next, at time t23, upon the turn-off of the pulse signal Pexc of the first hold time Thold1 in section (B) of FIG. 8, the driving circuit 27*d* turns on and off the high-pressure battery voltage pulse signal H-Vb supplied therefrom to the low-pressure switching element TR2 of the high-pressure fuel injector driving circuit 27*b*. Section (F) of FIG. 3 shows the turn-on and the turn-off state of the signal H-Vb. The fuel injector driving current Iinj is consequently controlled to maintain the second hold current Ih2.

The first hold time Thold1 is variable according to the fuel injection pulse width TI. In other words, the first hold time Thold1 is reduced as the fuel injection pulse width TI decreases. The first hold time Thold1 is also reduced with a decrease in the fuel pressure detected by the fuel pressure sensor. In addition, the first hold time Thold1 has its lower-limit value (e.g., 0.45 ms). When the driving pulse width TI is smaller than a required value of 0.6 ms, the first hold current Ihold1 is not supplied. Instead, the opening-valve current is supplied and then the second hold current Ihold2 is used to drive the fuel injector.

The second hold current Ih2 is a small excitation current (hold current) that allows the fuel injector 5 to barely maintain the valve-open state, and this current is 2.5 A, for example.

After that, at time t24, upon the turn-off of the fuel injection pulse signal Pinj of the pulse width TI in section (A) of FIG. 8, the high-pressure battery voltage pulse signal H-Vb supplied from the driving circuit 27*d* to the low-pressure switching element TR2 of the high-pressure fuel injector driving circuit 27*b* is turned off as shown in section (F) of FIG. 3. At the same time, the low-pressure pulse signal L supplied from the driving circuit 27*d* to the switching element TR3 of the low-pressure fuel injector driving circuit 27*c* is turned off as shown in section (G) of FIG. 3. Thus, as shown in section (C) of FIG. 8, the fuel injector driving current Iinj is shut off, and as shown in section (D) of FIG. 8, the valve lift quantity Vlv of the fuel injector 5 decreases to close the injector 5.

The waveform shown as a dotted line in section (B) of FIG. 8 applies when the first hold time Thold1 is fixed at 0.6 ms for a pulse width TI of 0.6 ms, for example. In this example, when the fuel injection pulse signal Pinj of the pulse width TI, shown in section (A) of FIG. 8, is turned off, since the fuel injector driving current Iinj is held at a level of the second hold current Ih2 as shown in the form of a triangular wave of a dotted line in section (C) of FIG. 8, if Iinj is turned off from this current, valve closing will be delayed. This state is shown as a dotted line in section (D) of FIG. 8.

As described above, since the first hold time Thold1 is reduced, injector valve closing control with the second hold current Ih2 on, not with the first hold current Ih1 on, can be achieved in the turn-off timing of the fuel injector driving pulse, and thus, stable valve-closing control of the fuel injector can be realized. In this case, the precharge current may also be supplied, as in FIG. 4.

As set forth above, according to the present embodiment, the valve of the fuel injector can be opened and closed accurately, even when the injection quantity required is small and the duration of power distribution to the fuel injector is short.

The configuration and operation of a fuel injection control apparatus for an internal combustion engine according to a third embodiment of the present invention will be described hereunder using FIG. 9. The description assumes that an internal combustion engine system configuration with the internal combustion engine fuel injection control apparatus according to the present embodiment is essentially the same as the system configuration shown in FIG. 1. The description also assumes that the configuration of the internal combustion engine fuel injection control apparatus according to the present embodiment is essentially the same as the system configuration shown in FIG. 2. In addition, the description assumes that the operation of the internal combustion engine fuel injection control apparatus, achieved in the present embodiment when the fuel injection pulse width is large, is essentially the same as the system configuration shown in FIG. 3. Furthermore, the description assumes that control by the internal combustion engine fuel injection control apparatus according to the present embodiment is essentially the same as the control sequence shown in FIG. 6.

Next, the operation of the internal combustion engine fuel injection control apparatus, achieved in the present embodiment when the fuel injection pulse width is small, will be described using FIGS. 9 and 10.

Figure 9:
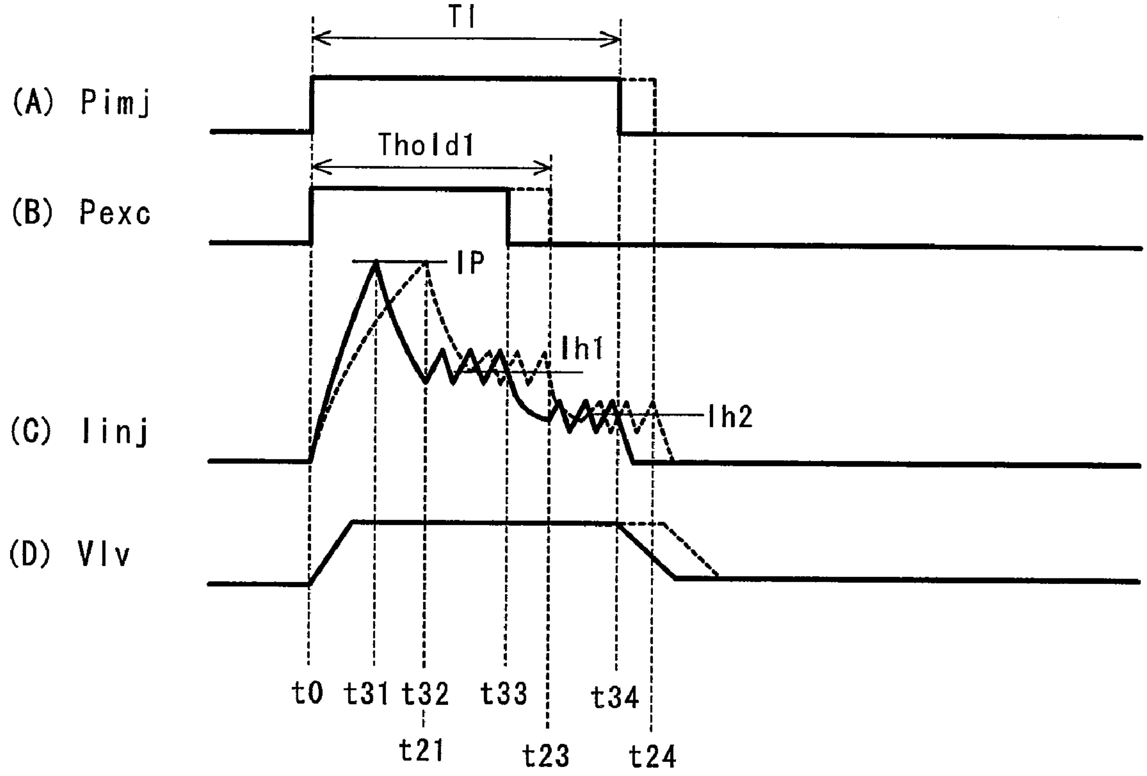
FIG. 9 is a timing chart that shows operation of an internal combustion engine fuel injection control apparatus according to a third embodiment of the present invention.

FIG. 9 is a timing chart showing the operation of the internal combustion engine fuel injection control apparatus according to the third embodiment of the present invention. Vertical axes in sections (A) to (D) of FIG. 9 denote the same as that of the vertical axes shown in sections (A) to (D) of FIG. 3.

A solid line in FIG. 9 denotes an operational waveform based on the present embodiment. A dotted line denotes, for comparison, the operational waveform shown as a solid line in FIG. 8.

As shown in section (A) of FIG. 9, at time t0, the injector pulse width computing unit 9*a* outputs the fuel injection pulse signal Pinj of the pulse width TI. The present embodiment assumes that the pulse width TI of the fuel injection pulse signal at this time is variable in a range, for example, from 0.5 ms to 5.0 ms. This example applies when the fuel injection pulse width is small, that is, when the pulse width TI is in a range, for example, from 0.5 ms to 0.8 ms. The example applies when the pulse width TI is 0.55 ms. More specifically, the pulse width shown as a dotted line is 0.6 ms, for example.

In addition, at the time t0, the injector driving signal waveform command unit 9*b* outputs the pulse signal Pexc of the first hold time Thold1, as shown in section (B) of FIG. 9. While, in the example of FIG. 4, the first hold time Thold1 has been fixed at, for example, 0.6 ms, the first hold time Thold1 in the present embodiment is variable according to the pulse width TI, that is, variable in a range from 0.35 ms to 0.55 ms.

Furthermore, in the present embodiment, the high voltage that the high-voltage generating circuit 27*a* shown in FIG. 2 outputs is set to be, for example, 90 V, which is higher than 60 V in FIG. 2. The value of the high voltage Vboost which the high-voltage generating circuit 27*a* outputs is assigned in the process of step S75 in FIG. 6.

As shown in section (E) of FIG. 3, at the time t0, when the fuel injection pulse signal Pinj of the pulse width TI turns on, the driving circuit 27*d* turns on the high-pressure boost pulse signal H-Vbst supplied to the high-pressure switching element TR1 of the high-pressure fuel injector driving circuit 27*b*. As shown in section (G) of FIG. 3, the driving circuit 27*d* also turns on the low-pressure pulse signal L supplied to the switching element TR3 of the low-pressure fuel injector driving circuit 27*c*. Thus, the high voltage from the high-voltage generating circuit 27*a* is supplied to the fuel injector 5, hence causing a flow of the fuel injector driving current Iinj, as shown in section (C) of FIG. 9. Since the value of the high voltage Vboost which the high-voltage generating circuit 27*a* outputs at this time is set to be 90 V, a signal rising edge of the fuel injector driving current Iinj exhibits a steeper gradient than when the value of the high voltage Vboost shown in section (C) of FIG. 9 is 60 V, for example. The t31–t0 time required for the arrival at the peak current Ip is therefore reduced below the time shown as a dotted line (i.e., the t21–t0 time required for the arrival at the peak current Ip). As will be described later herein using FIG. 10, the value of the high voltage Vboost is variable according to the particular fuel pressure. That is to say, the value of the high voltage Vboost is increased with increases in the fuel pressure. The value of the high voltage Vboost, however, has an upper limit of 120 V, for example. This is because, even if a voltage higher than 120 V is applied, a delay in the response of the fuel injector will not permit any faster initial rise of the valve-opening current.

When the fuel injector driving current Iinj increases to the current level required for valve opening of the fuel injector 5, the valve lift quantity Vlv thereof increases, as shown in section (D) of FIG. 9, and the fuel injector 5 begins to open the valve.

At time t31, upon detecting that the fuel injector driving current Iinj detected by the shunt resistor SR has reached the previously set high peak current Ip required for valve opening, the driving circuit 27*d* turns off the high-pressure boost pulse signal H-Vbst supplied to the high-pressure switching element Tr1 of the high-pressure fuel injector driving circuit 27*b*. Section (E) of FIG. 3 shows the turn-off state of the signal H-Vbst. The turn-off of H-Vbst reduces the fuel injector driving current Iinj, as shown in section (C) of FIG. 9. The peak current Ip is 10 A, for example.

At time t32, upon detecting that the fuel injector driving current Iinj detected by the shunt resistor SR has reached the previously set first hold current Ih1, the driving circuit 27*d* turns on and off the high-pressure battery voltage pulse signal H-Vb supplied therefrom to the low-pressure switching element TR2 of the high-pressure fuel injector driving circuit 27*b*. Section (F) of FIG. 3 shows the turn-on and the turn-off state of the signal H-Vb. The fuel injector driving current Iinj is thus controlled for the injector to maintain the first hold current Ih1.

The first hold current Ih1 is a relatively high excitation current (hold current) that allows the fuel injector 5 to reliably maintain the valve-open state, and this current is greater than the second hold current Ih2 described later herein, and is 4 A, for example. The first hold current value Ih1 and the supply time Thold1 are assigned in the process of step S55 in FIG. 6.

Next, at time t33, upon the turn-off of the pulse signal Pexc of the first hold time Thold1 in section (B) of FIG. 9, the driving circuit 27*d* turns on and off the high-pressure battery voltage pulse signal H-Vb supplied therefrom to the low-pressure switching element TR2 of the high-pressure fuel injector driving circuit 27*b*. Section (F) of FIG. 3 shows the turn-off state of the signal H-Vb. The fuel injector driving current Iinj is consequently controlled to maintain the second hold current Ih2.

The second hold current Ih2 is a small excitation current (hold current) that allows the fuel injector 5 to barely maintain the valve-open state, and this current is 2.5 A, for example.

After that, at time t34, upon the turn-off of the fuel injection pulse signal Pinj of the pulse width TI in section (A) of FIG. 9, the high-pressure battery voltage pulse signal H-Vb supplied from the driving circuit 27*d* to the low-pressure switching element TR2 of the high-pressure fuel injector driving circuit 27*b* is turned off as shown in section (F) of FIG. 3. At the same time, the low-pressure pulse signal L supplied from the driving circuit 27*d* to the switching element TR3 of the low-pressure fuel injector driving circuit 27*c* is turned off as shown in section (G) of FIG. 3. Thus, as shown in section (C) of FIG. 9, the fuel injector driving current Iinj is shut off, and as shown in section (D) of FIG. 9, the valve lift quantity Vlv of the fuel injector 5 decreases to close the injector 5.

The variable high voltage Vboost used in the internal combustion engine fuel injection control apparatus of the present embodiment will be described using FIG. 10.

Figure 10:
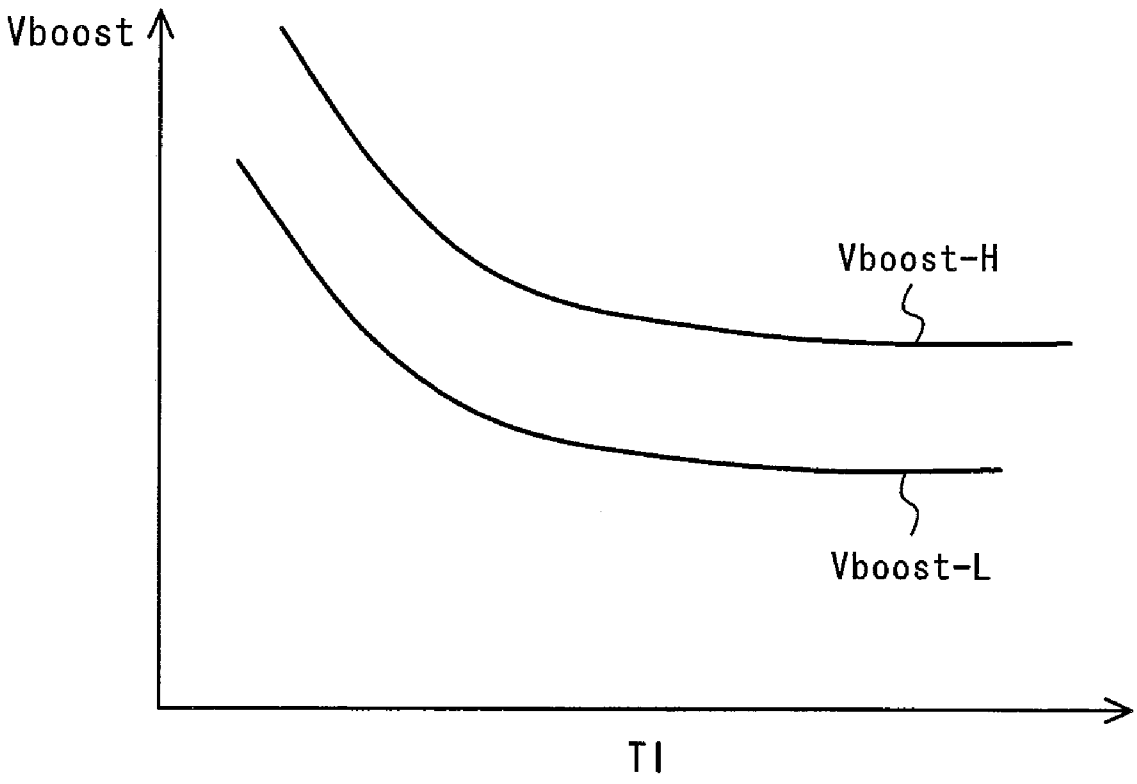
FIG. 10 is an illustrative diagram of a variable high voltage used in the internal combustion engine fuel injection control apparatus according to the third embodiment of the present invention.

FIG. 10 is an illustrative diagram of the variable high voltage used in the internal combustion engine fuel injection control apparatus according to the third embodiment of the present invention.

In the example of FIG. 8, since the first hold time Ih1 is reduced, a delay in the valve-opening operation of the fuel injector or other adverse effects are liable to occur. In the present embodiment, therefore, the time required for the injector valve-opening current to reach the peak current Ip is reduced to make the initial rising edge of the supply current to the injector steeper for stable injector valve-opening operation.

Behavior of the current which flows into the fuel injector is determined by the supply voltage, internal coil resistance (other electrical resistance included) of the injector, and inductance of the coil. Since the resistance and the inductance are variably uncontrollable, the voltage setting of the high-voltage power supply is made variable for the control of the time required for the arrival at the peak current Ip.

A horizontal axis denotes the fuel injection pulse width TI and a vertical axis denotes the high voltage Vboost in FIG. 10.

A solid line Vboost-H in FIG. 10 represents a relationship of the high voltage Vboost with respect to the fuel injection pulse width TI obtained at a high fuel pressure. A solid line Vboost-L represents a relationship of the high voltage Vboost with respect to the fuel injection pulse width TI obtained at a low fuel pressure. Although the relationships between the fuel injection pulse width TI and high voltage Vboost obtained at two different fuel pressures are represented in FIG. 10, the relationship between the fuel injection pulse width TI and high voltage Vboost obtained at an actual fuel pressure is changed even more closely or precisely according to fuel pressure.

As denoted by the solid lines Vboost-H and Vboost-L, the high voltage Vboost is reduced as the fuel injection pulse width TI increases, or is increased as TI decreases. In addition, as denoted by the solid lines Vboost-H and Vboost-L, the high voltage Vboost is increased as the fuel pressure increases. Thus, stable opening of the injector valve can be provided. The high voltage Vboost can be calculated using an arithmetic expression or map based on at least one of two parameters, namely, the fuel injection pulse width or the fuel pressure. The value of the high voltage Vboost has an upper limit, which is 120 V, for example. This is because, even if a voltage higher than 120 V is applied, the delay in the response of the fuel injector will not permit any faster initial rise of the valve-opening current. The high voltage Vboost can be a fixed value if the fuel injection quantitative performance that the internal combustion engine demands is satisfied.

As described above, since the high voltage to be supplied to the injector is enhanced, the time required for the arrival at the peak current Ip can be shortened and even for a short duration of power distribution to the injector, stable injector valve closing control can be achieved. In this case, the precharge current may also be supplied, as in FIG. 4.

As set forth above, according to the present embodiment, the valve of the fuel injector can be opened and closed accurately, even when the injection quantity required is small and the duration of power distribution to the fuel injector is short.

The configuration and operation of a fuel injection control apparatus for an internal combustion engine according to a fourth embodiment of the present invention will be described hereunder using FIG. 11. The description assumes that an internal combustion engine system configuration with the internal combustion engine fuel injection control apparatus according to the present embodiment is essentially the same as the system configuration shown in FIG. 1. The description also assumes that the configuration of the internal combustion engine fuel injection control apparatus according to the present embodiment is essentially the same as the system configuration shown in FIG. 2. In addition, the description assumes that the operation of the internal combustion engine fuel injection control apparatus, achieved in the present embodiment when the fuel injection pulse width is large, is essentially the same as the system configuration shown in FIG. 3. Furthermore, the description assumes that control by the internal combustion engine fuel injection control apparatus according to the present embodiment is essentially the same as the control sequence shown in FIG. 6.

Next, the operation of the internal combustion engine fuel injection control apparatus, achieved in the present embodiment when the fuel injection pulse width is small, will be described using FIG. 11.

Figure 11:
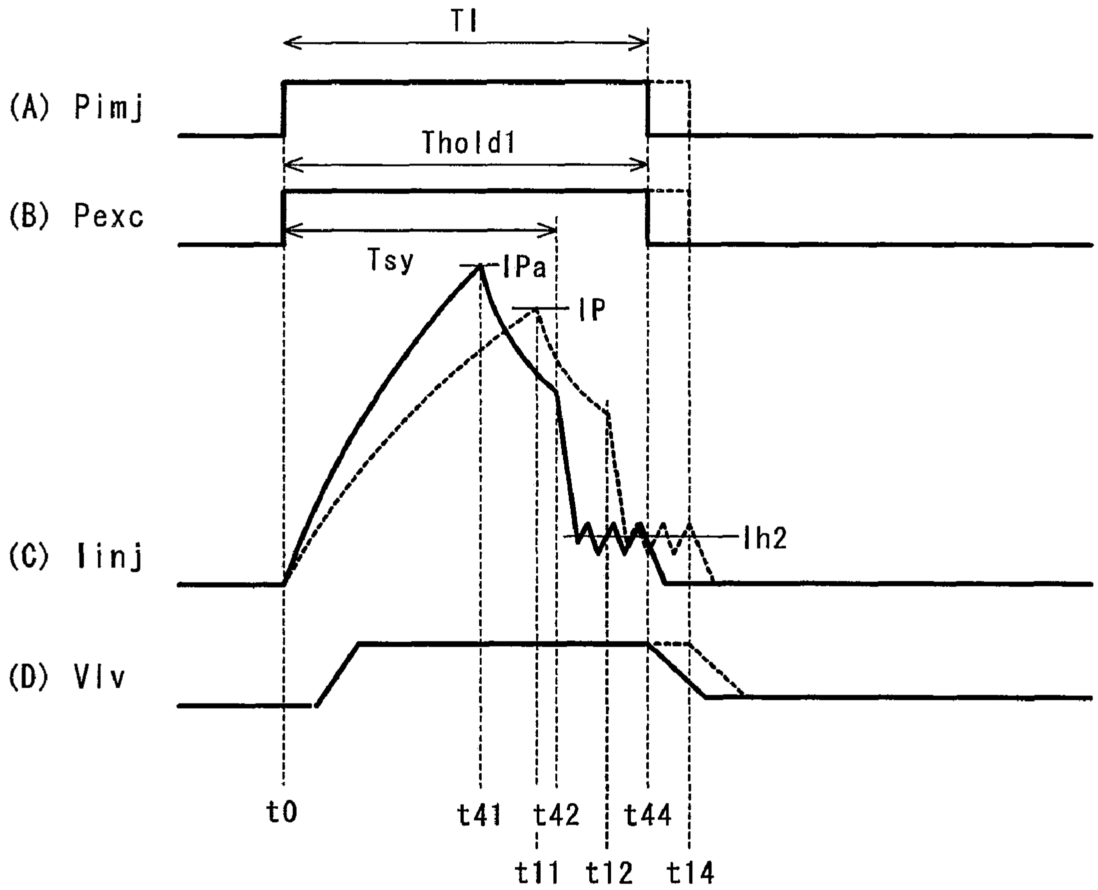
FIG. 11 is a timing chart that shows operation of an internal combustion engine fuel injection control apparatus according to a fourth embodiment of the present invention.

FIG. 11 is a timing chart showing the operation of the internal combustion engine fuel injection control apparatus according to the fourth embodiment of the present invention. Vertical axes in sections (A) to (D) of FIG. 11 denote the same as that of the vertical axes shown in sections (A) to (D) of FIG. 3.

A solid line in FIG. 11 denotes an operational waveform based on the present embodiment. A dotted line denotes, for comparison, the operational waveform shown as a solid line in FIG. 4.

As shown in section (A) of FIG. 11, at time t0, the injector pulse width computing unit 9*a* outputs the fuel injection pulse signal Pinj of the pulse width TI. The present embodiment assumes that the pulse width TI of the fuel injection pulse signal at this time is variable in a range, for example, from 0.5 ms to 5.0 ms. This example applies when the fuel injection pulse width is small, that is, when the pulse width TI is in a range, for example, from 0.5 ms to 0.8 ms. More specifically, the pulse width shown as a dotted line is 0.6 ms, for example.

In addition, at the time t0, the injector driving signal waveform command unit 9*b* outputs the pulse signal Pexc of the first hold time Thold1, as shown in section (B) of FIG. 11. While, in the example of FIG. 4, the first hold time Thold1 has been fixed at, for example, 0.6 ms, the first hold time Thold1 in the present embodiment is variable according to the pulse width TI, that is, variable in a range from 0.35 ms to 0.55 ms.

Furthermore, in the present embodiment, the high voltage that the high-voltage generating circuit 27*a* shown in FIG. 2 outputs is set to be, for example, 90 V, which is higher than 60 V in FIG. 2. The value of the high voltage Vboost which the high-voltage generating circuit 27*a* outputs is assigned in the process of step S75 in FIG. 6.

As shown in section (E) of FIG. 3, at the time t0, when the fuel injection pulse signal Pinj of the pulse width TI turns on, the driving circuit 27*d* turns on the high-pressure boost pulse signal H-Vbst supplied to the high-pressure switching element TR1 of the high-pressure fuel injector driving circuit 27*b*. As shown in section (G) of FIG. 3, the driving circuit 27*d* also turns on the low-pressure pulse signal L supplied to the switching element TR3 of the low-pressure fuel injector driving circuit 27*c*. Thus, the high voltage from the high-voltage generating circuit 27*a* is supplied to the fuel injector 5, hence causing a flow of the fuel injector driving current Iinj, as shown in section (C) of FIG. 11. Since the value of the high voltage Vboost which the high-voltage generating circuit 27*a* outputs at this time is set to be 90 V, the signal rising edge of the fuel injector driving current Iinj exhibits a steeper gradient than when the value of the high voltage Vboost shown in section (C) of FIG. 11 is 60 V, for example. As described using FIG. 11, the value of the high voltage Vboost is variable according to the particular fuel pressure. That is to say, the value of the high voltage Vboost is increased with increases in the fuel pressure.

When the fuel injector driving current Iinj increases to the current level required for valve opening of the fuel injector 5, the valve lift quantity Vlv thereof increases, as shown in section (D) of FIG. 11, and the fuel injector 5 begins to open the valve.

At time t41, upon detecting that the fuel injector driving current Iinj detected by the shunt resistor SR has reached the previously set high peak current Ipa required for valve opening, the driving circuit 27*d* turns off the high-pressure boost pulse signal H-Vbst supplied to the high-pressure switching element Tr1 of the high-pressure fuel injector driving circuit 27*b*. Section (E) of FIG. 3 shows the turn-off state of the signal H-Vbst. The turn-off of H-Vbst reduces the fuel injector driving current Iinj, as shown in section (C) of FIG. 11. The peak current Ipa here is 13 A, which is higher than the peak current Ip described in FIG. 4 (e.g., 10 A). The value of the peak current Ipa is assigned in the process of step S65 in FIG. 6. The assigned value of the peak current Ipa is made variable in accordance with the fuel injector valve driving pulse width TI. More specifically, the assigned value of the peak current Ipa is reduced as the driving pulse width TI decreases. In addition, the assigned value of the peak current Ipa is reduced as the fuel pressure decreases.

As shown in section (G) of FIG. 4, at time t42, upon the lapse of the rapid-discharge starting time Tsy set in the injector driving signal waveform command unit 9*b* of FIG. 2, the driving circuit 27*d* turns off the low-pressure pulse signal L supplied to the switching element TR3 of the low-pressure fuel injector driving circuit 27*c*. Thus, the current in the injector 5 is recirculated by the recirculation diode RD1 of FIG. 2 to return to the high-voltage generating circuit 27*a*, and as a result, this current is rapidly discharged for a more rapid decrease than during the t11–t12 time. The rapid-discharge starting time Tsy is, for example, from 0.40 to 0.55 ms. As described in FIG. 5, the rapid-discharge starting time Tsy is variable according to the particular fuel injection pulse width TI and fuel pressure.

Next, upon detecting that the fuel injector driving current Iinj detected by the shunt resistor SR has reached the previously set second hold current Ih2 at which the valve-open state can be maintained, the driving circuit 27*d* turns on the low-pressure pulse signal L supplied to the switching element TR3 of the low-pressure fuel injector driving circuit 27*c*. Section (G) of FIG. 4 shows the turn-on state of the signal L. In addition, as shown in section (F) of FIG. 4, the driving circuit 27*d* turns on and off the high-pressure battery voltage pulse signal H-Vb supplied therefrom to the low-pressure switching element TR2 of the high-pressure fuel injector driving circuit 27*b*. Thus, the fuel injector driving current Iinj is controlled for the injector to maintain the second hold current Ih2. The second hold current Ih2 is a small excitation current (hold current) that allows the fuel injector 5 to barely maintain the valve-open state, and this current is 2.5 A, for example.

At time t44, upon the turn-off of the fuel injection pulse signal Pinj of the pulse width TI that is shown in section (A) of FIG. 11, the high-pressure battery voltage pulse signal H-Vb supplied from the driving circuit 27*d* to the low-pressure switching element TR2 of the high-pressure fuel injector driving circuit 27*b* turns off and at the same time, as shown in section (G) of FIG. 4, the low-pressure pulse signal L supplied from the driving circuit 27*d* to the switching element TR3 of the low-pressure fuel injector driving circuit 27*c* also turns off. Thus, as shown in section (C) of FIG. 11, the fuel injector driving current Iinj is interrupted, and as shown in section (D) of FIG. 11, the valve lift quantity Vlv of the fuel injector 5 decreases to close the injector 5.

In this manner, since the high voltage to be supplied to the injector is enhanced, the time required for the arrival at the peak current Ip can be shortened and even for a short duration of power distribution to the injector, stable operation and control for injector valve opening can be achieved by assigning a large value to the peak current Ip.

As set forth above, according to the present embodiment, the valve of the fuel injector can be opened and closed accurately, even when the injection quantity required is small and the duration of power distribution to the fuel injector is short.

What is claimed is:

1. A fuel injector control apparatus for an internal combustion engine which includes a fuel injector for injecting fuel directly into a combustion chamber of the internal combustion engine, and a fuel pressure sensor for detecting a pressure of the fuel supplied to the fuel injector; wherein:

the control apparatus is adapted to control the fuel injector for driving thereof by calculating, from an operational state of the internal combustion engine and fuel pressure detected by the fuel pressure sensor, pulse width of a pulse signal which drives a valve of the injector;

the control apparatus comprises a driving signal waveform command unit;

after a valve-opening command has turned on and a high valve-opening current for opening the fuel injector valve has been supplied from a high-voltage source to the fuel injector, the command unit discharges the current and supplies from a low-voltage source a hold current Ih2 to allow the fuel injector to maintain the valve-open state; and during a time from supply of the valve-opening current to arrival at a value of the hold current Ih2, after an elapse of a previously assigned rapid-discharge starting time Tsy from the turn-on of the valve-opening command, the command unit rapidly discharges the current until the hold current Ih2 has been reached.

2. The fuel injector control apparatus according to claim 1, wherein:

the driving signal waveform command unit renders the rapid-discharge starting time Tsy variable in accordance with at least one parameter selected from the group consisting of the driving pulse width and the fuel pressure detected by the fuel pressure sensor;

as the driving pulse width decreases, the rapid-discharge starting time Tsy is reduce; and as the fuel pressure decreases, the rapid-discharge starting time Tsy is decreased.

3. The fuel injector control apparatus according to claim 2, wherein:

the driving signal waveform command unit controls a minimum value of the rapid-discharge starting time Tsy to obtain a time longer than that required for the valve-opening current to reach a predetermined peak current after the valve-opening command is turned on.

4. The fuel injector control apparatus according to claim 1, wherein:

after the high valve-opening current for opening the valve of the fuel injector has been supplied to the injector, the command unit renders a discharge-starting peak current Ipa variable in accordance with at least one parameter selected from the group consisting of the driving pulse width and the fuel pressure detected by the fuel pressure sensor;

as the driving pulse width decreases, the peak current Ipa is reduce; and as the fuel pressure decreases, the peak current Ipa is decreased.

5. The fuel injector control apparatus according to claim 1, wherein:

the driving signal waveform command unit renders a voltage Vboost of the high-voltage source variable in accordance with at least one parameters selected from the group consisting of the driving pulse width or the fuel pressure detected by the fuel pressure sensor;

as the driving pulse width decreases, the voltage Vboost of the high-voltage source is increased; and as the fuel pressure decreases, the voltage Vboost of the high-voltage source is decreased.

6. The fuel injector control apparatus according to claim 1, wherein:

before turning on the valve-opening command, the driving signal waveform command unit charges into the fuel injector an excitation current Ipr that is smaller than a current at which the valve of the fuel injector operates.

7. A fuel injector control apparatus for an internal combustion engine which includes a fuel injector for injecting fuel directly into a combustion chamber of the internal combustion engine, and a fuel pressure sensor for detecting a pressure of the fuel supplied to the fuel injector; wherein:

the control apparatus is adapted to control the fuel injector for driving thereof by calculating, from an operational state of the internal combustion engine and fuel pressure detected by the fuel pressure sensor, pulse width of a pulse signal which drives a valve of the injector;

the control apparatus comprises a driving signal waveform command unit;

after a valve-opening command has turned on and a high valve-opening current for opening the fuel injector valve has been supplied from a high-voltage source to the fuel injector, the command unit discharges the current and, after supplying from a low-voltage source a first hold current Ih1 to allow the fuel injector to maintain the valve-open state, supplies a second hold current Ih2 to allow the fuel injector to maintain the valve-open state, the second hold current Ih2 being smaller than the first hold current Ih1; and after the valve-opening command has turned on, the command unit renders variable a hold time Thold1 during which the first hold current Ih1 will be supplied.

8. The fuel injector control apparatus according to claim 7, wherein:

the driving signal waveform command unit renders the hold time Thold1 variable in accordance with at least one parameter selected from the group consisting of the driving pulse width and the fuel pressure detected by the fuel pressure sensor;

as the driving pulse width decreases, the hold time Thold1 is reduced; and as the fuel pressure lowers, the hold time Thold1 is reduced.

9. The fuel injector control apparatus according to claim 7, wherein:

the driving signal waveform command unit renders a voltage Vboost of the high-voltage source variable in accordance with at least one parameter selected from the group consisting of the driving pulse width and the fuel pressure detected by the fuel pressure sensor;

as the driving pulse width decreases, the voltage Vboost of the high-voltage source is increased; and as the fuel pressure decreases, the voltage Vboost of the high-voltage source is decreased.

* * * * *